United States Patent
Xu et al.

(10) Patent No.: US 12,166,569 B2
(45) Date of Patent: Dec. 10, 2024

(54) SATELLITE COMMUNICATION METHOD AND APPARATUS

(71) Applicant: Huawei Technologies Co., Ltd., Shenzhen (CN)

(72) Inventors: Chenlei Xu, Hangzhou (CN); Hejia Luo, Hangzhou (CN); Jianwei Zhou, Hangzhou (CN); Xiaolu Wang, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 18/176,642

(22) Filed: Mar. 1, 2023

(65) Prior Publication Data
US 2023/0208514 A1 Jun. 29, 2023

Related U.S. Application Data

(63) Continuation of application No. PCT/CN2021/116226, filed on Sep. 2, 2021.

(30) Foreign Application Priority Data

Sep. 2, 2020 (CN) .......................... 202010910513.1

(51) Int. Cl.
H04B 7/204 (2006.01)
H04B 7/06 (2006.01)
H04W 52/02 (2009.01)

(52) U.S. Cl.
CPC ......... *H04B 7/2041* (2013.01); *H04B 7/0639* (2013.01); *H04W 52/0235* (2013.01)

(58) Field of Classification Search
CPC .. H04B 7/1853; H04B 7/2041; H04B 7/0639; H04W 52/0235
See application file for complete search history.

(56) References Cited

U.S. PATENT DOCUMENTS

2017/0156122 A1* 6/2017 Lu ....................... H04L 43/0817

* cited by examiner

*Primary Examiner* — Rahel Guarino
(74) *Attorney, Agent, or Firm* — Slater Matsil, LLP

(57) ABSTRACT

This application provides a satellite communication method and apparatus. A terminal obtains a level-1 broadcast signal from a satellite, where a beam status corresponding to the level-1 broadcast signal is an energy saving state, and the level-1 broadcast signal includes synchronization information. The terminal obtains a level-2 broadcast signal from the satellite, where a beam status corresponding to the level-2 broadcast signal is a broadband communication state. The terminal communicates with the satellite based on the level-2 broadcast signal.

20 Claims, 10 Drawing Sheets

SATELLITE COMMUNICATION METHOD AND APPARATUS

CROSS-REFERENCE TO RELATED APPLICATIONS

This application is a continuation of International Application No. PCT/CN2021/116226, filed on Sep. 2, 2021, which claims priority to Chinese Patent Application No. 202010910513.1, filed on Sep. 2, 2020. The disclosures of the aforementioned applications are hereby incorporated by reference in their entireties.

TECHNICAL FIELD

This application relates to the field of communication technologies, and in particular, to a satellite communication method and apparatus.

BACKGROUND

A future communication network system not only needs to meet service requirements of various industries, but also needs to provide a wider service coverage. Compared with terrestrial cellular communication, satellite communication has great advantages. The satellite communication has a longer communication distance, a larger coverage area, and a wider communication frequency band, and can provide a user with a communication service anytime and anywhere. Therefore, the satellite communication has a very broad application prospect, and has unique advantages in aspects such as international and domestic communication, and emergency relief.

An issue of power consumption has always been paid attention to in evolution of communication systems of previous generations. However, when a base station is located on a communication satellite and executes a broadband communication service with high performance and a high throughput, the issue of power consumption is more prominent than that of terrestrial communication because a power source of the satellite is limited. A traditional satellite communication signal commonly uses a narrowband signal, and a future satellite communication system will use a broadband signal. Compared with the traditional satellite communication signal, the broadband satellite communication signal has wide bandwidth and a high data rate that significantly increase power consumption of a satellite. Therefore, an issue of how to reduce power consumption of satellite communication urgently needs to be resolved.

SUMMARY

Embodiments of this application provide a satellite communication method and apparatus, to reduce power consumption of satellite communication by using dynamic scheduling of a beam.

To achieve the foregoing objective, the following technical solutions are used in embodiments of this application.

According to a first aspect, an embodiment of this application provides a satellite communication method. The method may be performed by a terminal, or may be performed by a chip applied to a terminal. The following provides description by using an example in which an execution body is a terminal. The method includes the following. The terminal obtains a level-1 broadcast signal from a satellite, where a beam status corresponding to the level-1 broadcast signal is an energy saving state, and the level-1 broadcast signal includes synchronization information. Then, the terminal obtains a level-2 broadcast signal from the satellite, where a beam status corresponding to the level-2 broadcast signal is a broadband communication state. Then, the terminal communicates with the satellite based on the level-2 broadcast signal.

In the communication method provided in this embodiment of this application, the terminal may obtain two types of broadcast signals from the satellite: the level-1 broadcast signal and the level-2 broadcast signal. The beam status corresponding to the level-1 broadcast signal is the energy saving state, and the beam status corresponding to the level-2 broadcast signal is the broadband communication state. Beam power in the energy saving state is far lower than beam power in the broadband communication state. Therefore, when the beam status is in the energy saving state, power consumption of satellite communication is significantly reduced. When the beam status is in the broadband communication state, the terminal may perform high-performance and high-throughput communication with the satellite within a coverage area of a beam.

In a possible implementation, before the satellite sends the level-2 broadcast signal, the satellite obtains a request message from the terminal, where the request message is used to request the satellite to send the level-2 broadcast signal.

In other words, the terminal determines, from the level-1 broadcast signal, that the beam is in the energy saving state. When the terminal has a communication service requirement, the terminal sends the request message to the satellite. The request message is used to request the satellite to convert a beam status corresponding to a location of the terminal into the broadband communication state, and send the level-2 broadcast signal. It can be learned that in this implementation, in a manner in which the terminal calls the satellite, the satellite dynamically schedules the beam, and changes the beam status from the energy saving state to the broadband communication state, so that utilization of a communication resource of the satellite beam is maximized. In addition, in a manner in which the terminal calls the satellite beam, beam scheduling flexibility is improved.

In a possible implementation, a ratio of a sending period of the level-1 broadcast signal to a sending period of the level-2 broadcast signal is 1:N, where N is a positive integer greater than or equal to 2.

It can be learned that, compared with the level-1 broadcast signal, the level-2 broadcast signal is sent at a lower frequency. In other words, in most of the time, the beam status is in the energy saving state with low energy consumption, thereby further reducing power consumption of the satellite.

In a possible implementation, when the beam status is in the energy saving state, the terminal can obtain only the level-1 broadcast signal from the satellite and/or send request information to the satellite; or when the beam status is in the broadband communication state, the terminal has capabilities of accessing a network request and performing a specific communication service. In other words, when the beam status is in the energy saving state, the terminal cannot perform the specific communication service, and the terminal can perform the specific communication service only when the beam status is in the broadband communication state.

In a possible implementation, the request information includes at least one of the following: a satellite number called by the terminal, a satellite cell number, and a beam number.

It can be learned that the request information explicitly or implicitly includes one or more types of information: the satellite number called by the terminal, the number of the satellite cell in which the terminal is located, and the beam number, so that the satellite obtains information about a to-be-switched beam.

In a possible implementation, the terminal periodically sends request information to the satellite until a beam status corresponding to a location of the terminal changes.

In other words, when the beam status indicated by the level-1 broadcast signal changes, or the terminal can successfully obtain the level-2 broadcast signal, the terminal stops sending the request information. Alternatively, the terminal reaches a maximum quantity of sending times, that is, a threshold is preset. When a quantity of sending times exceeds the specified threshold, the terminal stops sending the request information.

In a possible implementation, the level-1 broadcast signal is scrambled by using a scrambling code associated with the satellite number, and an expression form of scrambling of the level-1 broadcast signal is as follows:

$$C_{broadcast,i,s}(k) = S_{r,i}(k) \times C_{broadcast,i}(k)$$

$C_{broadcast,i}(k)$ is an original level-1 broadcast signal from a satellite numbered i, $S_{r,i}(k)$ is a scrambling code associated with the satellite number i, and $C_{broadcast,i,s}(k)$ is a scrambled level-1 broadcast signal.

It can be learned that the level-1 broadcast signal is a broadcast signal scrambled by using the scrambling code associated with the satellite number. Because beams from different satellites may cover a same area, the terminal may receive, at the same time, level-1 broadcast signals sent by a plurality of satellites. In the foregoing implementation, the terminal can distinguish level-1 broadcast signals from different satellites, therefore, mutual interference between the level-1 broadcast signals from different satellites is avoided, and that the terminal cannot correctly receive a level-1 broadcast signal from a specific satellite or incorrectly receives a level-1 broadcast signal from another satellite is avoided.

In a possible implementation, the level-1 broadcast signal includes a synchronization code, and the synchronization code indicates a satellite cell number and/or a beam number; or the level-1 broadcast signal includes a synchronization code and a beam number.

In other words, the synchronization code in the level-1 broadcast signal may implicitly indicate the satellite cell number and/or the satellite beam number, that is, different satellite cell numbers and/or different satellite beam numbers use different synchronization codes. In this indication manner, the level-1 broadcast signal needs to include only the synchronization code, so that content of the level-1 broadcast signal is simplified, and indication overheads are reduced. Alternatively, the level-1 broadcast signal may include the synchronization code and a broadcast message. The broadcast message explicitly indicates the satellite cell number and/or the beam number, and the broadcast message is generated after channel coding is performed. In this indication manner, all satellite cells and satellite beams can share a same synchronization code, so that detection complexity that is when the terminal detects the synchronization code is lower.

In a possible implementation, the level-1 broadcast signal further includes information about a sending frequency of the level-2 broadcast signal; or a sending frequency of the level-1 broadcast signal is in a one-to-one mapping relationship with a sending frequency of the level-2 broadcast signal.

In other words, the mapping relationship between the level-1 broadcast signal and the level-2 broadcast signal may be agreed on, that is, the sending frequency of the level-2 broadcast signal may be directly or indirectly obtained from the level-1 broadcast signal. For example, the sending frequency of the level-2 broadcast signal may be directly indicated in the level-1 broadcast signal. For another example, the sending frequency of the level-2 broadcast signal may be deduced based on the sending frequency of the level-1 broadcast signal and an agreed calculation formula. It can be learned that complexity of searching for the sending frequency of the level-2 broadcast signal by the terminal is reduced.

In a possible implementation, the level-1 broadcast signal further includes time domain synchronization information of the level-2 broadcast signal.

In other words, the level-1 broadcast signal includes the synchronization code, and is aligned with a timeslot of the level-2 broadcast signal. Therefore, the terminal may obtain some synchronization information from the level-1 broadcast signal, to quickly complete time domain synchronization with the level-2 broadcast signal.

According to a second aspect, an embodiment of this application provides a satellite communication method. The method may be performed by a satellite or another network device, or may be performed by a chip applied to a satellite or another network device. The following provides description by using an example in which an execution body is a satellite. The method includes: The satellite sends a level-1 broadcast signal to a terminal, where a beam status corresponding to the level-1 broadcast signal is an energy saving state, and the level-1 broadcast signal includes synchronization information. Then, the satellite sends a level-2 broadcast signal to the terminal, where a beam status corresponding to the level-2 broadcast signal is a broadband communication state. Then, the satellite communicates with the terminal based on the secondary broadcast signal.

In the communication method provided in this embodiment of this application, the satellite may send two types of broadcast signals to the terminal: the level-1 broadcast signal and the level-2 broadcast signal. The beam status corresponding to the level-1 broadcast signal is the energy saving state, and the beam status corresponding to the level-2 broadcast signal is the broadband communication state. Beam power in the energy saving state is far lower than beam power in the broadband communication state. Therefore, when the beam status is in the energy saving state, power consumption of satellite communication is significantly reduced. When the beam status is in the broadband communication state, the satellite may perform high-performance and high-throughput communication with a terminal in a coverage area of a beam.

In a possible implementation, before the terminal obtains the level-2 broadcast signal, the terminal sends a request message to the satellite, where the request message is used to request the satellite to send the level-2 broadcast signal.

In other words, the terminal determines, from the level-1 broadcast signal, that the beam is in the energy saving state. When the terminal has a communication service requirement, the terminal sends the request message to the satellite. The request message is used to request the satellite to convert a beam status corresponding to a location of the terminal into the broadband communication state, and send the level-2 broadcast signal. It can be learned that in this implementation, in a manner in which the terminal calls the satellite, the satellite dynamically schedules the beam, and changes the beam status from the energy saving state to the broadband communication state, so that utilization of a communication resource of the satellite beam is maximized. In addition, in a manner in which the terminal calls the satellite beam, beam scheduling flexibility is improved.

In a possible implementation, a ratio of a sending period of the level-1 broadcast signal to a sending period of the level-2 broadcast signal is 1:N, where N is a positive integer greater than or equal to 2. It can be learned that, compared with the level-1 broadcast signal, the level-2 broadcast signal is sent at a lower frequency. In other words, in most of the time, the beam status is in the energy saving state with low energy consumption, thereby further reducing power consumption of the satellite.

In a possible implementation, when the beam status is in the energy saving state, the satellite can send only the level-1 broadcast signal to the terminal and/or obtain request information from the terminal; or when the beam status is in the broadband communication state, the satellite has capabilities of processing a network access request and performing a specific communication service. In other words, when the beam status is in the energy saving state, the satellite and the terminal cannot perform the specific communication service, and the satellite and the terminal can perform the specific communication service only when the beam status is in the broadband communication state.

In a possible implementation, the request information includes at least one of the following: a satellite number called by the terminal, a satellite cell number, and a beam number. It can be learned that the request information explicitly or implicitly includes one or more types of information: the satellite number called by the terminal, the number of the satellite cell in which the terminal is located, and the beam number, so that the satellite obtains information about a to-be-switched beam.

In a possible implementation, the level-1 broadcast signal is scrambled by using a scrambling code associated with the satellite number, and an expression form of scrambling of the level-1 broadcast signal is as follows:

$$C_{broadcast,i,s}(k)=S_{r,i}(k)\times C_{broadcast,i}(k)$$

$C_{broadcast,i}(k)$ is an original level-1 broadcast signal from a satellite numbered i, $S_{r,i}(k)$ is a scrambling code associated with the satellite number i, and $C_{broadcast,i,s}(k)$ is a scrambled level-1 broadcast signal.

It can be learned that the level-1 broadcast signal is a broadcast signal scrambled by using the scrambling code associated with the satellite number. Because beams from different satellites may cover a same area, the terminal may receive, at the same time, level-1 broadcast signals sent by a plurality of satellites. In the foregoing implementation, the terminal can distinguish level-1 broadcast signals from different satellites, therefore, mutual interference between the level-1 broadcast signals from different satellites is avoided, and that the terminal cannot correctly receive a level-1 broadcast signal from a specific satellite or incorrectly receives a level-1 broadcast signal from another satellite is avoided.

In a possible implementation, the level-1 broadcast signal includes a synchronization code, and the synchronization code indicates a satellite cell number and/or a beam number; or the level-1 broadcast signal includes a synchronization code and a beam number.

In other words, the synchronization code in the level-1 broadcast signal may implicitly indicate the satellite cell number and/or the satellite beam number, that is, different satellite cell numbers and/or different satellite beam numbers use different synchronization codes. In this indication manner, the level-1 broadcast signal needs to include only the synchronization code, so that content of the level-1 broadcast signal is simplified, and indication overheads are reduced. Alternatively, the level-1 broadcast signal may include the synchronization code and a broadcast message. The broadcast message explicitly indicates the satellite cell number and/or the beam number, and the broadcast message is generated after channel coding is performed. In this indication manner, all satellite cells and satellite beams can share a same synchronization code, so that detection complexity that is when the terminal detects the synchronization code is lower.

In a possible implementation, the level-1 broadcast signal further includes information about a sending frequency of the level-2 broadcast signal; or a sending frequency of the level-1 broadcast signal is in a one-to-one mapping relationship with a sending frequency of the level-2 broadcast signal.

In other words, the mapping relationship between the level-1 broadcast signal and the level-2 broadcast signal may be agreed on, that is, the sending frequency of the level-2 broadcast signal may be directly or indirectly obtained from the level-1 broadcast signal. For example, the sending frequency of the level-2 broadcast signal may be directly indicated in the level-1 broadcast signal. For another example, the sending frequency of the level-2 broadcast signal may be deduced based on the sending frequency of the level-1 broadcast signal and an agreed calculation formula. It can be learned that complexity of searching for the sending frequency of the level-2 broadcast signal by the terminal is reduced.

In a possible implementation, the level-1 broadcast signal further includes time domain synchronization information of the level-2 broadcast signal.

In other words, the level-1 broadcast signal includes the synchronization code, and is aligned with a timeslot of the level-2 broadcast signal. Therefore, the terminal may obtain some synchronization information from the level-1 broadcast signal, to quickly complete time domain synchronization with the level-2 broadcast signal.

In a possible implementation, a trigger condition for switching the beam status from the energy saving state to the broadband communication state may include any one or more of the following: The satellite obtains request information of the terminal; or the satellite obtains a handover request of the terminal; or the satellite discovers a paging target terminal; or the satellite obtains an upper-layer instruction for forcibly switching to the broadband communication state.

That is, when the satellite obtains request information of at least one terminal, or the satellite obtains the handover request or scheduling information of the terminal, the handover request herein refers to an application that the terminal in a connected mode is about to be handed over to a specific beam coverage area. The application may be sent by the terminal, or may be sent by another satellite or a cooperative base station of the current satellite. Alternatively, when a paging target user exists in the satellite beam, or the satellite obtains an upper-layer instruction and the instruction is used to instruct the satellite to forcibly switch to the broadband communication state, the beam status is switched from the energy saving state to the broadband communication state. It can be learned that a broadband communication service is enabled in a manner in which the terminal calls the satellite and the satellite performs scheduling, so that utilization of a communication resource of the satellite beam can be maximized. In addition, the broadband communication service of the beam is enabled only when the terminal in the coverage area has a communication requirement, so that use based on demand is implemented and power consumption of the satellite is significantly reduced.

In a possible implementation, the trigger condition for switching the beam status from the broadband communication state to the energy saving state includes any one or more of the following: The satellite obtains no broadband communication service within a preset time threshold; or the satellite obtains no handover request of the terminal within a preset time threshold; or the satellite obtains an upper-layer instruction for forcibly switching to the energy saving state.

That is, when there is no broadband communication service or no terminal in a connected mode in the beam for a period of time, the beam status is switched to the energy saving state; or when there is no scheduling information or handover request indicating the terminal in a connected mode to enter the coverage area of the beam exists in the beam for a period of time, the beam status is switched to the energy saving state; or when the beam receives an upper-layer instruction, where the instruction is used to instruct to forcibly switch to the energy saving state, the beam is switched to the energy saving state. It can be learned that when there is no longer a need to communicate with the terminal located in the service range of the beam, the beam is switched to the energy saving state, flexibility is achieved to some extent, and power consumption of the satellite is significantly reduced.

In a possible implementation, when the terminal in the connected mode enters a coverage area of another satellite or another cooperative base station, the current satellite sends signaling to the satellite or the cooperative base station and the signaling indicates the satellite or the cooperative base station to switch the beam status to the broadband communication state.

That is, because the satellite is in a constantly moving state, there may be a scenario in which the terminal is about to be out of the service range of the current satellite. That is, when the terminal is about to enter a service range of another satellite or a service range of another cooperative base station, the current satellite may indicate, in a signaling manner, a next satellite or cooperative base station to start a corresponding broadband communication service, to ensure that the terminal in the connected mode can continuously perform the broadband communication service, thereby avoiding a phenomenon that the terminal cannot perform broadband communication temporarily.

In a possible implementation, a process in which the beam status is switched from the broadband communication state to the energy saving state is controlled by a first timer and a second timer. The first timer is started or restarted when request information or terminal service data is obtained. The second timer is started or restarted when an application of handover of the terminal in a connected mode to the beam service area is obtained. The beam status is switched from the broadband communication state to the energy saving state after both the first timer and the second timer expire.

It can be learned that, in the foregoing implementation, two timers are used to control disabling of a broadband communication function during a no-service period, that is, the beam status is switched from the broadband communication state to the energy saving state, flexibility is achieved to some extent, a communication resource can be effectively allocated, and power consumption of the satellite is significantly reduced.

According to a third aspect, an embodiment of this application provides a satellite communication terminal device, configured to perform the method in any possible implementation of the first aspect. The terminal device may be the terminal device in any possible implementation of the first aspect, or may be a module applied to the terminal device, for example, a chip or a chip system. The terminal device includes a module, a unit, a means, or the like corresponding to the method performed by a first communication apparatus in any possible implementation of the first aspect. The module, the unit, or the means may be implemented by using hardware, software, or hardware executing corresponding software. The hardware or software includes one or more modules or units corresponding to a function performed by the terminal device in any possible implementation of the first aspect.

The terminal device includes a processing unit and a transceiver unit.

The processing unit is configured to determine a type of a broadcast signal.

The transceiver unit is configured to obtain a level-1 broadcast signal, where a beam status corresponding to the level-1 broadcast signal is an energy saving state.

The level-1 broadcast signal includes synchronization information.

The transceiver unit is further configured to obtain a level-2 broadcast signal, where a beam status corresponding to the level-2 broadcast signal is a broadband communication state.

The transceiver unit is further configured to perform communication based on the level-2 broadcast signal.

In a possible implementation, before the transceiver unit obtains the level-2 broadcast signal, the transceiver unit sends request information, where the request information is used to request a satellite to send the level-2 broadcast signal.

In a possible implementation, a ratio of a sending period of the level-1 broadcast signal to a sending period of the level-2 broadcast signal is 1:N, where N is a positive integer greater than or equal to 2.

In a possible implementation, when the beam status is in the energy saving state, the transceiver unit can obtain only the level-1 broadcast signal and/or send request information; or when the beam status is in the broadband communication state, the processing unit has capabilities of accessing a network request and performing a specific communication service.

In a possible implementation, the request information includes at least one of the following: a satellite number, a satellite cell number, and a beam number.

In a possible implementation, the transceiver unit periodically sends request information to the satellite until a beam status corresponding to a location of the transceiver unit changes.

In a possible implementation, the level-1 broadcast signal is scrambled by using a scrambling code associated with the satellite number, and an expression form of scrambling of the level-1 broadcast signal is as follows:

$$C_{broadcast,i,s}(k) = S_{r,i}(k) \times C_{broadcast,i}(k)$$

$C_{broadcast,i}(k)$ is an original level-1 broadcast signal from a satellite numbered i, $S_{r,i}(k)$ is a scrambling code associated with the satellite number i, and $C_{broadcast,i,s}(k)$ is a scrambled level-1 broadcast signal.

In a possible implementation, the level-1 broadcast signal includes a synchronization code, and the synchronization code indicates a satellite cell number and/or a beam number; or the level-1 broadcast signal includes a synchronization code and a beam number.

In a possible implementation, the level-1 broadcast signal further includes information indicating a sending frequency of the level-2 broadcast signal; or a sending frequency of the level-1 broadcast signal is in a one-to-one mapping relationship with a sending frequency of the level-2 broadcast signal.

In a possible implementation, the level-1 broadcast signal further includes time domain synchronization information of the level-2 broadcast signal.

It should be noted that for beneficial effects of implementations of the terminal device provided in the third aspect of embodiments of this application, refer to beneficial effects of any possible implementation method of the first aspect. Details are not described herein again.

According to a fourth aspect, an embodiment of this application provides a satellite or network device for satellite communication, configured to perform the method in any possible implementation of the second aspect. The network device may be the satellite or the network device in any possible implementation of the second aspect, or a module applied to the satellite or the network device, such as a chip or a chip system. The satellite or the network device includes a module, a unit, a means, or the like corresponding to the method performed by the satellite or the network device in any possible implementation of the second aspect. The module, the unit, or the means may be implemented by using hardware, software, or hardware executing corresponding software. The hardware or software includes one or more modules or units corresponding to a function performed by the satellite or the network device in any possible implementation of the second aspect.

The network device includes a processing unit and a transceiver unit.

The processing unit determines a level-1 broadcast signal.

The transceiver unit sends the level-1 broadcast signal, where a beam status corresponding to the level-1 broadcast signal is an energy saving state.

The level-1 broadcast signal includes synchronization information.

The processing unit determines a level-2 broadcast signal.

The transceiver unit sends the level-2 broadcast signal, where a beam status corresponding to the level-2 broadcast signal is a broadband communication state.

In a possible implementation, before the transceiver unit sends the level-2 broadcast signal, the transceiver unit obtains request information, and the request information is used to request the transceiver unit to send the level-2 broadcast signal.

In a possible implementation, a ratio of a sending period of the level-1 broadcast signal to a sending period of the level-2 broadcast signal is 1:N, where N is a positive integer greater than or equal to 2.

In a possible implementation, when the beam status is in the energy saving state, the transceiver unit can send only the level-1 broadcast signal and/or obtain request information; or when the beam status is in the broadband communication state, the processing unit has capabilities of processing a network access request and performing a specific communication service.

In a possible implementation, the request information includes at least one of the following: a satellite number called by a terminal, a satellite cell number, and a beam number.

In a possible implementation, the level-1 broadcast signal includes a synchronization code, and the synchronization code indicates a satellite cell number and/or a beam number; or the level-1 broadcast signal includes a synchronization code and a beam number.

In a possible implementation, the level-1 broadcast signal is scrambled by using a scrambling code associated with the satellite number, and an expression form of scrambling of the level-1 broadcast signal is as follows:

$$C_{broadcast,i,s}(k) = S_{r,i}(k) \times C_{broadcast,i}(k)$$

$C_{broadcast,i}(k)$ is an original level-1 broadcast signal from a satellite numbered i, $S_{r,i}(k)$ is a scrambling code associated with the satellite number i, and $C_{broadcast,i,s}(k)$ is a scrambled level-1 broadcast signal.

In a possible implementation, the level-1 broadcast signal further includes information indicating a sending frequency of the level-2 broadcast signal; or a sending frequency of the level-1 broadcast signal is in a one-to-one mapping relationship with a sending frequency of the level-2 broadcast signal.

In a possible implementation, the level-1 broadcast signal further includes time domain synchronization information of the level-2 broadcast signal.

In a possible implementation, a trigger condition for switching the beam status from the energy saving state to the broadband communication state includes any one or more of the following: request information of the terminal is obtained; or a handover request of the terminal is obtained; or a paging response of a target terminal is obtained; or an upper-layer instruction for forcibly switching to the broadband communication state is obtained.

In a possible implementation, a trigger condition for switching the beam status from the broadband communication state to the energy saving state includes any one or more of the following: No broadband communication service is obtained within a preset time threshold; or no handover request of the terminal is obtained within a preset time threshold; or an upper-layer instruction for forcibly switching to the energy saving state is obtained.

In a possible implementation, when the terminal in a connected mode enters a coverage area of another satellite or a cooperative base station, the current transceiver unit sends signaling to the another satellite or the cooperative base station, where the signaling indicates a beam status of the another satellite or the cooperative base station to switch to the broadband communication state.

In a possible implementation, a process of switching the broadband communication state to the energy saving state is controlled by a first timer and a second timer.

The first timer is started or restarted when request information or terminal service data is obtained.

The second timer is started or restarted when an application of handover of the terminal in the connected mode to a beam service area is obtained.

The beam is switched from the broadband communication state to the energy saving state after both the first timer and the second timer expire.

It should be noted that for beneficial effects of implementations of the satellite or the network device provided in the fourth aspect of embodiments of this application, refer to beneficial effects of any possible implementation of the second aspect. Details are not described herein again.

According to a fifth aspect, an embodiment of this application provides a communication apparatus. The communication apparatus includes a processor and a memory. The memory is configured to store computer instructions. When the processor executes the instructions, the communication apparatus is enabled to perform the method in any one of the foregoing aspects. The communication apparatus may be the terminal device in any one of the first aspect or the possible implementations of the first aspect, or a chip that implements a function of the terminal device; or the communication apparatus may be the network device in any one of the second aspect or the possible implementations of the second aspect, or a chip that implements a function of the network device.

According to a sixth aspect, an embodiment of this application provides a communication apparatus, including a processor. The processor is configured to: after being coupled to a memory and reading instructions in the memory, perform the method in any one of the foregoing aspects according to the instructions. The communication apparatus may be the terminal device in any one of the first aspect or the possible implementations of the first aspect, or a chip that implements a function of the terminal device; or the communication apparatus may be the network device in any one of the second aspect or the possible implementations of the second aspect, or a chip that implements a function of the network device.

According to a seventh aspect, an embodiment of this application provides a chip, including a logic circuit and an input/output interface. The input/output interface is configured to communicate with a module outside the chip. For example, the input/output interface is configured to input/output a level-1 broadcast signal and/or a level-2 broadcast signal, or the input/output interface is configured to input/output request information, or the input/output interface is configured to input/output an upper-layer instruction. The logic circuit is configured to run a computer program or instructions, to implement the communication method provided in any one of the foregoing aspects. The chip may be a chip that implements a function of the terminal device in any one of the first aspect or the possible implementations of the first aspect, or the chip may be a chip that implements a function of the network device in any one of the second aspect or the possible implementations of the second aspect.

According to an eighth aspect, an embodiment of this application provides a computer-readable storage medium. The computer-readable storage medium stores instructions. When the instructions are run on a computer, the computer can perform the communication method according to any one of the foregoing aspects.

According to a ninth aspect, an embodiment of this application provides a computer program product including instructions. When the computer program product is run on a computer, the computer can perform the communication method according to any one of the foregoing aspects.

According to a tenth aspect, an embodiment of this application provides a circuit system. The circuit system includes a processing circuit, and the processing circuit is configured to perform the communication method in any one of the foregoing aspects.

According to an eleventh aspect, an embodiment of this application provides a communication system. The communication system includes the terminal device and the network device in any one of the foregoing aspects.

For technical effects brought by any implementation of the fifth aspect to the eleventh aspect, refer to beneficial effects in the corresponding method provided above. Details are not described herein again.

DETAILED DESCRIPTION OF ILLUSTRATIVE EMBODIMENTS

In the specification and accompanying drawings of this application, the terms "first", "second", and the like are intended to distinguish between different objects or distinguish between different processing of a same object, but do not indicate a particular order of the objects. In addition, the terms "including", "having", or any other variant thereof in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device. In embodiments of this application, the "a plurality of" includes two or more, and the "system" and the "network" may be replaced with each other. In embodiments of this application, the word "example" or "for example" or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In addition, network architectures and service scenarios described in embodiments of this application are intended to describe the technical solutions in embodiments of this application more clearly, and do not constitute a limitation on the technical solutions provided in embodiments of this application. A person of ordinary skill in the art may learn that with evolution of the network architectures and emergence of new service scenarios, the technical solutions provided in embodiments of this application are also applicable to similar technical problems.

The following describes embodiments of this application with reference to the accompanying drawings in embodiments of this application. Terms used in embodiments of this application are only used to explain specific embodiments of this application, but are not intended to limit this application.

Figure 1:
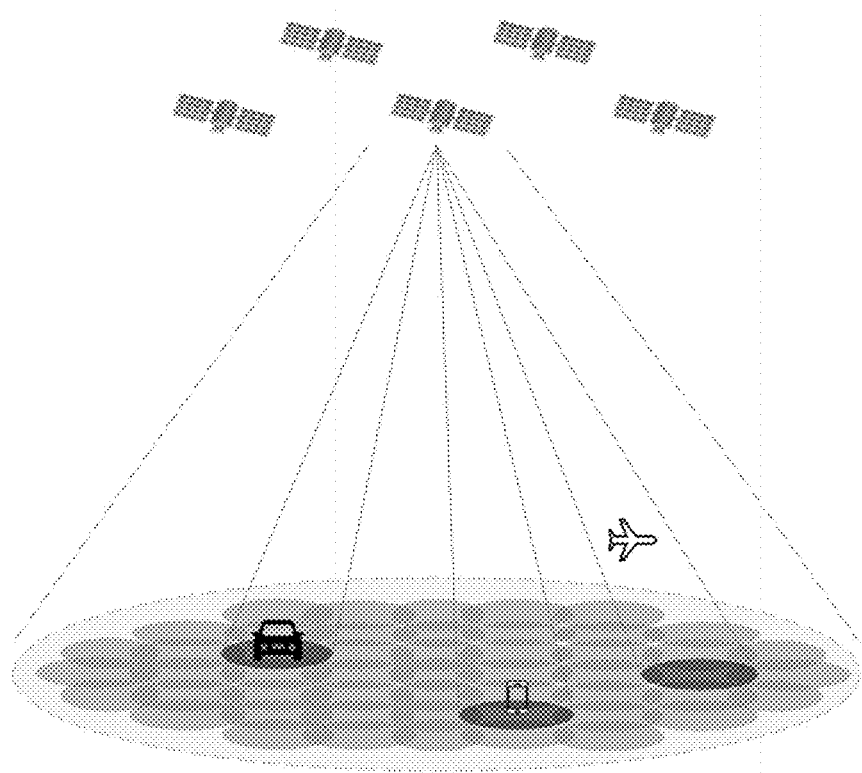
FIG. 1 is a schematic diagram of a satellite communication scenario according to an embodiment of this application.

FIG. 1 is a schematic diagram of a satellite communication scenario according to an embodiment of this application. Compared with terrestrial cellular communication, satellite communication has obvious advantages such as a long communication distance, a large coverage area, and a wide communication frequency band, and can provide a user with a communication service anytime and anywhere. Therefore, the satellite communication has a broad development prospect, and has unique advantages in aspects such as international and domestic communication, and emergency relief. As shown in FIG. 1, a satellite that normally orbits and works around the earth is used as a base station (or a satellite transparently transmits a user signal to a terrestrial station), to implement a wide area coverage communication scenario in an independent or inter-satellite collaboration manner. A single satellite can generate thousands of beams with high gain and a small coverage area. The satellite communication is mainly used as supplementary communication of a terrestrial cellular network. The satellite communication provides communication services for sparsely populated areas such as high altitudes, oceans, deserts, high mountains, and remote mountain villages, or provides communication services for areas such as disaster-stricken areas and large gathering places, where terrestrial cellular networks are insufficient to provide services. User equipment communicating with the satellite is a common mobile terminal or a dedicated terminal.

According to orbital altitudes of satellites, satellite communication systems can be classified into a geostationary earth orbit (GEO) system, a medium earth orbit (MEO) satellite communication system, and a low earth orbit (LEO) satellite communication system. A GEO satellite is also called a geostationary orbit satellite, and has an orbital altitude of 35786 km. The GEO satellite has main advantages of being stationary relative to the ground and providing a large coverage area. However, disadvantages of the GEO satellite are also relatively prominent, for example, if a distance between the GEO satellite and a surface of the earth is excessively long, an antenna with a relatively large diameter is required. A transmission delay of the GEO satellite is relatively large, and is about 0.5 s, which cannot meet a requirement of a real-time service. In addition, the GEO satellite has a relatively limited orbit resource, high launching costs, and cannot provide coverage for polar areas. An MEO satellite has an orbital altitude of 2000 km to 35786 km and can achieve global coverage with a relatively small number of satellites. However, the MEO satellite has a higher transmission delay than that of an LEO satellite and is mainly used for positioning and navigation. An orbital altitude of the LEO satellite ranges from 300 km to 2000 km. The LEO satellite has a low data transmission delay, a low power loss, and low launching costs. Therefore, the LEO satellite communication network has made great progress in recent years and has attracted attention.

Satellite communication systems are classified into transparent satellite systems and regenerative satellite systems based on an on-board processing capability. A transparent satellite only performs transparent transmission and spectrum shifting on a signal, and does not involve information processing. A regenerative satellite has an on-board signal processing capability. The satellite can extract an original baseband signal and use information for routing and switching and system configuration. At present, the transparent satellite system and the regenerative satellite system coexist and are developed together.

Satellite communication systems can be classified into a non-gaze satellite system and a gaze satellite system based on whether a satellite beam moves with the satellite. A satellite beam of the non-gaze satellite system moves with the satellite. Each beam angle of the satellite does not change with time. Relatively frequent beam switching occurs at a fixed terrestrial point when the satellite flies over the point. A beam angle of the satellite in the gaze satellite system is adjusted in a specified manner. Continuous observation can be implemented for the fixed terrestrial point by using the satellite through switching of the beam angle.

In a terrestrial cellular communication system, a terminal needs to access a cell to perform normal communication. A first step of accessing the cell is to complete a cell search, and the cell search includes a series of synchronization processes. In a process of the cell search and initial synchronization, the terminal may achieve frequency and symbol synchronization with the cell, obtain a start location of a downlink frame, determine a number of a cell to be camped on, and decode necessary system information. The cell search and initial synchronization depend on a downlink broadcast message. A broadcast message includes a synchronization signal and a basic system message. When a base station is in a working state, the base station needs to periodically send a broadcast message, so that the terminal can find a cell to which the terminal belongs at any time. Generally, a broadcast message has a fixed sending period and a fixed occupied bandwidth. Sending the broadcast message causes inherent time frequency resource and power overheads of the base station in the working state. For example, in a 5th generation mobile communication technology (5G) New Radio system (also referred to as an NR system for short), downlink synchronization is implemented by searching for a synchronization signal in a synchronization signal block (SSB) and decoding system messages in a physical broadcast channel (PBCH) and a physical downlink shared channel (PDSCH). A main objective is to implement symbol synchronization, frame synchronization, and frequency synchronization, and obtain a physical cell number, a system message, and the like. The NR system covers an entire cell through beam sweeping. At a specific moment, the base station transmits a narrow beam to cover a specific direction, and at a next moment, the base station transmits a narrow beam to cover another direction until the entire cell is scanned. The SSB needs to be configured in each beam, so that the terminal implements downlink synchronization. Each SSB includes 240 consecutive subcarriers in frequency domain. A time domain sending period of the SSB may be configured as 5, 10, 20, 40, 80, or 160 milliseconds. During an initial cell search, the terminal considers that the period of the SSB is 20 milliseconds by default. In each period, all SSBs need to be transmitted within a specific half-frame (5 milliseconds).

Similar to the terrestrial cellular communication system, an electromagnetic wave transmitted by a satellite antenna forms a projection beam on the surface of the earth, and a broadcast message of a specific period and bandwidth also exists in a coverage area of each beam, so that a terminal in the coverage area of the beam can access a network at any time. Similarly, sending the broadcast message causes inherent power overheads of the base station in the working state. Compared with a conventional single-carrier satellite communication signal, a broadband satellite communication signal has a larger bandwidth and a higher data rate, and even a bandwidth of the broadcast message is much larger than that of the single-carrier signal. For example, it is assumed that a signal 1 is a single-carrier signal, a signal bandwidth is 200 kHz, and a cubic metric (CM) value of the signal is 0 dB. The signal 1 herein may be considered to have a signal bandwidth and a CM value that are of a direct sequence spread spectrum (DSSS). A signal 2 is a broadband communication signal, a signal bandwidth is 3.6 MHz, and a CM value of the signal is 4.76 dB. The signal 2 herein may be considered to have a signal bandwidth and a CM value that are of an NR SSB of 15 kHz. To ensure that carrier to noise ratios (CNR) of two types of signals received by the user are the same, difference between equivalent isotropic radiated power (EIRP) of the signal 1 and that of the signal 2 sent by the satellite is as follows:

$$EIRP_{sig,2}(dBW) = EIRP_{sig,1}(dB)W + 12.55(dB) + 4.76(dB)$$

$$= EIRP_{sig,1}(dBW) + 17.31(dB)$$

Bandwidth difference between the signal 1 and the signal 2 causes an EIRP difference of 12.55 dB. A signal peak-to-average ratio difference between the signal 1 and the signal 2 causes an EIRP difference of 4.76 dB. A total EIRP difference between the signal 1 and the signal 2 is 17.31 dB. It can be seen that power consumption of the satellite increases significantly when the broadband signal is sent.

In another aspect, service distribution of satellites orbiting around the earth at different times and on different grounds is excessively unbalanced. If the satellite communication is used as a supplementary coverage form of the cellular communication system, a communication function only needs to be enabled in limited service distribution areas, and in most coverage areas and coverage time, a communication service function does not need to be enabled, and a broadcast message does not need to be sent. The limited service distribution areas mainly include two types: a supplementary coverage area of a cellular network and a hotspot capacity expansion area. Supplementary coverage areas of cellular networks include no man's land such as oceans, high altitudes, deserts, and high mountains, disaster-stricken areas, and polar areas. Hotspot capacity expansion areas include stadiums and business centers, and the like. In addition, based on population distribution information, more than 90% of the world's population is distributed on land accounting for about 3% of the earth's area, and the rest of the land and oceans accounting for about 70% of the earth's area have few and scattered users. Based on location distribution information of global aircraft and ships, more than 90% of the earth's regions do not have distribution of aircraft and ship tracks. For example, if the satellite enables broadband communication services only in a limited service distribution area that accounts for about 10% of the earth's area, and sends only narrowband communication signals in the rest of the time, average power consumption of the satellite will be significantly reduced.

$$EIRP(dBW) = 10\% \times EIRP_{sig,2}(dBW) + 90\% \times EIRP_{sig,1}(dBW)$$

$$= EIRP_{sig,2}(dBW) - 9.33(dB)$$

At this time, compared with average EIRP(dBW)= $EIRP_{sig,2}$(dBW) when a broadband communication function is enabled globally, an average EIRP is 9.33 dB lower. It can be learned that if the satellite can dynamically schedule a beam, so that the beam accurately covers the limited service distribution area, and a broadband communication function of another beam is disabled, utilization of a communications resource can be maximized, and power consumption of the satellite can also be significantly reduced.

In view of this, an embodiment of this application provides a satellite communication method, to reduce power consumption of satellite communication by using dynamic scheduling of a beam.

The communication method provided in this embodiment of this application may be applied to various communication systems, for example, a satellite communication system, Internet of things (IoT), Narrow Band Internet of Things (NB-IoT) system, a global system for mobile communications (GSM), an enhanced data rate for GSM evolution (EDGE) system, a wideband code division multiple access (WCDMA) system, a code division multiple access 2000 (CDMA2000) system, a time division synchronous code division multiple access (TD-SCDMA) system, a long term evolution (LTE) system, a 5th generation (5G) communication system, such as 5G new radio (NR) and three application scenarios of the 5G mobile communication system: enhanced mobile broadband (eMBB), ultra-reliable low-latency communication (uRLLC), and massive machine-type communications ( ), a device-to-device (D2D) communication system, a machine-to-machine (M2M) communication system, an Internet of Vehicles communication system, or another or future communication system. This is not specifically limited in this embodiment of this application.

Figure 2:
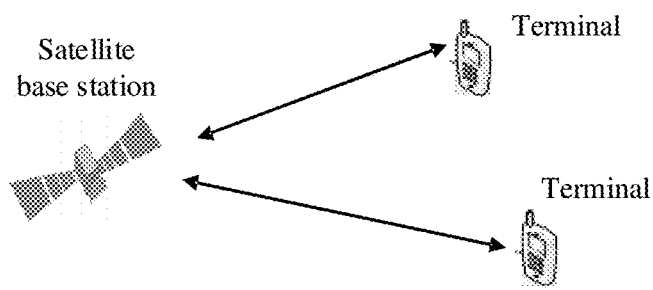
FIG. 2 is a system architectural diagram of a satellite communication system according to an embodiment of this application.

To facilitate understanding of embodiments of this application, an application scenario used in embodiments of this application is described by using a network architecture shown in FIG. 2. The network architecture may be applied to the foregoing various communication systems. The network architecture shown in FIG. 2 includes a network device (represented as a satellite base station in FIG. 2) and a terminal device. The network device communicates with the terminal device. There may be one or more network devices, and there may be one or more terminal devices (two terminal devices are shown in FIG. 2). Types and quantities of the network device and terminal device are not limited in this embodiment of this application.

The terminal device includes a device that provides voice and/or data connectivity for a user. Specifically, the terminal device includes a device that provides a voice for the user, or includes a device that provides data connectivity for the user, or includes a device that provides voice and data connectivity for a user. For example, the terminal device may include a handheld device having a wireless connection function, or a processing device connected to a wireless modem. The terminal device may communicate with a core network through a radio access network (RAN), and exchange a voice or data with the RAN, or interact a voice and data with the RAN. The terminal device may include user equipment (UE), a wireless terminal device, a mobile terminal device, a device-to-device (D2D) terminal device, a vehicle-to-everything (V2X) terminal device, a machine-to-machine/machine type communications (M2M/MTC) terminal device, an Internet of Things (IoT) terminal device, light UE, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communication service (PCS) phone, a cordless telephone set, a session initiation protocol (SIP) phone, a wireless local loop (WLL) station, or a personal digital assistant (PDA). The terminal device may alternatively include a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

As an example instead of a limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that are dedicated to only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal device is also referred to as an on-board unit (OBU).

In embodiments of this application, the terminal device may further include a relay (relay). Alternatively, it is understood that any device that can perform data communication with a base station may be considered as a terminal device.

In embodiments of this application, an apparatus configured to implement a function of the terminal device may be a terminal device, or may be an apparatus, for example, a chip system, that can support the terminal device in implementing the function. The apparatus may be installed in the terminal device. In this embodiment of this application, the chip system may include a chip, or may include a chip and another discrete component. In the technical solutions provided in embodiments of this application, the technical solutions provided in embodiments of this application are described by using an example in which the apparatus configured to implement the function of the terminal is the terminal device.

The network device includes, for example, an access network (AN) device such as a base station (for example, an access point), and may be a device that is in an access network and that communicates with a wireless terminal device over an air interface through one or more cells. Alternatively, the network device is, for example, a road side unit (RSU) in a vehicle-to-everything (V2X) technology. The base station may be configured to perform mutual conversion between a received over-the-air frame and an IP packet and serve as a router between the terminal device and a remaining part of the access network. The remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB, evolutional NodeB) in a long term evolution (LTE) system or a long term evolution-advanced (LTE-A) system, or may include a next generation nodeB (gNB) in a 5th generation (5G) mobile communication technology NR system (also briefly referred to as an NR system), or may include a central unit (CU) and a distributed unit (DU) in a cloud radio access network (Cloud RAN) system, or may be an apparatus bearing a network device function in a future communication system. This is not limited in this embodiment of this application.

The network device may further include a core network device. The core network device includes, for example, an access and mobility management function (AMF) or a user plane function (UPF).

Alternatively, the network device may be an apparatus that carries a function of a network device in device-to-device (D2D) communication, machine-to-machine (M2M) communication, Internet of Vehicles, or a satellite communication system.

It should be noted that only manners of communication between some network elements are listed above, and other network elements may also communicate with each other in some connection manners. Details are not described herein again in this embodiment of this application.

The system architecture and application scenarios described in embodiments of this application are intended to describe the technical solution in embodiments of this application more clearly, and do not constitute a limitation on the technical solutions provided in embodiments of this application. A person of ordinary skill in the art may learn that the technical solutions provided in embodiments of this application are also applicable to a similar technical problem as a network architecture evolves and a new service scenario emerges.

The following specifically describes the satellite communication method provided in embodiments of this application.

It should be noted that in the following embodiments of this application, names of messages between network elements, names of parameters in messages, or the like are merely examples, and may be other names during specific implementation. This is uniformly described herein, and details are not described below again.

It should be understood that a beam mentioned in the following embodiments of this application may be a single beam, or may be a beam cluster including a plurality of adjacent beams. This is uniformly described herein, and details are not described below again.

Figure 3:
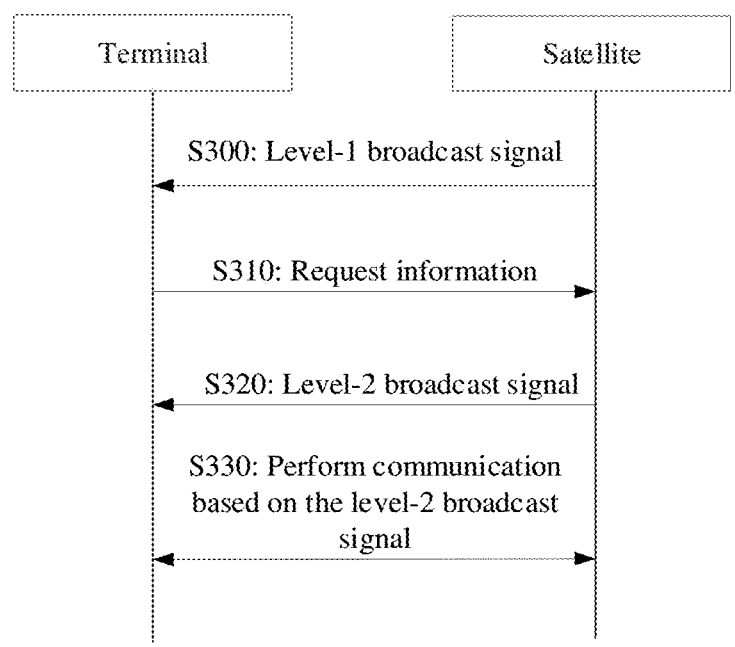
FIG. 3 is a schematic diagram of steps of a method for dynamically scheduling a beam according to an embodiment of this application.

An embodiment of this application provides a method for dynamically scheduling a beam by calling a satellite by a terminal. A main procedure and steps of the method are shown in FIG. 3.

S300: The satellite sends a level-1 broadcast signal, and the terminal obtains the level-1 broadcast signal.

A beam status corresponding to the level-1 broadcast signal is an energy saving state, and the level-1 broadcast signal includes synchronization information.

When the terminal is located in a coverage area of a specific beam of a specific satellite, the satellite may send two different broadcast signals to the terminal. One of the two broadcast signals is the level-1 broadcast signal, and the beam status corresponding to the level-1 broadcast signal is the energy saving state. In this case, the satellite beam is in a low power consumption state, and can only periodically send a broadcast signal of low power consumption, but does not have capabilities of processing a network access request of the terminal and performing a specific communication service.

In a possible implementation, the level-1 broadcast signal has characteristics of a simple modulation and demodulation method, a low peak-to-average signal ratio, and a relatively narrow bandwidth. The simple modulation and demodulation method reduces calculation power consumption of the satellite, the low peak-to-average ratio improves power amplification efficiency of the satellite, and the narrow signal bandwidth improves a power spectral density of the signal. For example, the level-1 broadcast signal may use a low-order modulated direct sequence spread spectrum (DSSS) signal or a Gaussian minimum frequency shift keying (GMSK) signal. It can be learned that when the beam status is in the energy saving state, power consumption of the satellite is significantly reduced.

In a possible implementation, the level-1 broadcast signal includes necessary beam information, and at least one of a synchronization code, a satellite cell number, or a satellite beam number may be obtained from the beam information. The level-1 broadcast signal may include only the synchronization code. The synchronization code may implicitly indicate the satellite cell number and/or the satellite beam number, that is, different satellite cells and/or different satellite beams use different synchronization codes. In this indication manner, content of the level-1 broadcast signal may be simplified, and only the synchronization code needs to be included, thereby further reducing transmit power of the level-1 broadcast signal, that is, further reducing power consumption of the satellite in the energy saving state. Alternatively, the level-1 broadcast signal may include two parts: the synchronization code and a broadcast message. The broadcast message part may explicitly indicate the satellite cell number and/or the satellite beam number. The broadcast message is a message generated after channel coding is performed. In this indication manner, all satellite cells and satellite beams can share a same synchronization code, so that detection complexity that is when the terminal detects the synchronization code can be reduced. In another aspect, the level-1 broadcast signal may indicate a current satellite beam status in an implicit or explicit manner. One indication manner is using a satellite beam number with a special digit to indicate a state of the beam. For example, if a total quantity of beams in a specific satellite cell is 12, 0x0 to 0xB may indicate valid beam numbers of beams in the energy saving state, and 0xF indicates that the beam is in a broadband communication state. In addition, optionally, the level-1 broadcast signal may further include bit information indicating a satellite beam status, and information about a frequency of a level-2 broadcast signal. Similarly, the message may also be implicitly indicated by using the synchronization code, or explicitly indicated by using the broadcast message.

In a possible implementation, a scenario in which beams from different satellites cover a same geographical location may occur. In this case, there is a probability that the terminal detects a plurality of satellites at the same time. To enable the terminal to distinguish between broadcast signals from different satellites, the level-1 broadcast signal may be scrambled by using a scrambling code associated with a satellite number, as shown in the following equation:

$$C_{broadcast,i,s}(k) = S_{r,i}(k) \times C_{broadcast,i}(k)$$

$C_{broadcast,i}(k)$ is an original level-1 broadcast signal from a satellite numbered i, $S_{r,i}(k)$ is a scrambling code associated with the satellite number i, and $C_{broadcast,i,s}(k)$ (is a scrambled level-1 broadcast signal. It can be learned that, in this implementation, mutual interference between level-1 broadcast signals from different satellites can be avoided, and that the terminal cannot correctly receive a level-1 broadcast signal from a specific satellite or incorrectly receives a level-1 broadcast signal from another satellite can be avoided.

In a possible implementation, in consideration of reducing complexity of searching for the level-1 broadcast signal by the terminal, level-1 broadcast signals of all satellites should be distributed on as few frequencies as possible. This requires that a quantity of scrambling code sequences be sufficient, and that relatively good auto-correlation and cross-correlation exist. For example, a gold (gold) sequence has relatively good correlation performance, and can easily generate a large quantity of sequences. Therefore, the gold (gold) sequence is one of selections of scrambling code sequences of a broadcast signal. When the quantity of scrambling code sequences is insufficient, level-1 broadcast signals of different satellites may be further distinguished in a frequency division manner. For example, it may be defined that the level-1 broadcast signals are discretely distributed in a frequency domain of a specific range in a form of a synchronization grid, to reduce complexity of performing frequency scanning by the terminal. For example, a minimum possible frequency of the level-1 broadcast signal is $f_{1,min}$, and a synchronization grid distance is $\Delta f_1$. According to an equation $f_1 = f_{1,min} + \Delta f_1 \cdot N, N = 0, 1, \ldots, N_{max}$, a frequency scanning location $f_1$ at which the terminal performs frequency scanning on the level-1 broadcast signal may be calculated. In addition, when the terminal receives level-1 broadcast signals from a plurality of satellites, the terminal stops detecting a broadcast signal of another satellite if a signal that meets a received signal-to-noise ratio is detected.

S310: The terminal sends request information, and the satellite obtains the request information.

As described in step S300, at the beginning, the satellite beam is in the energy saving state, and the terminal determines, from the level-1 broadcast signal, that the beam is in the energy saving state. When the terminal has a communication service requirement, the terminal actively sends the request information to the satellite. The request information is used to request the satellite to convert a beam status corresponding to a location of the terminal into the broadband communication state. After receiving the request information, the satellite switches the beam to the broadband communication state. It can be learned that in this implementation, in a manner in which the terminal calls the satellite, the satellite dynamically schedules the beam, and changes the beam status from the energy saving state to the broadband communication state, so that utilization of a communication resource of the satellite beam is maximized. In addition, in a manner in which the terminal calls the satellite beam, beam scheduling flexibility is improved.

In a possible implementation, the request information includes at least one of the following: a satellite number called by the terminal, a satellite cell number, and a beam number.

It should be understood that the request information explicitly or implicitly includes one or more types of information: the satellite number called by the terminal, the number of the satellite cell in which the terminal is located, and the beam number, so that the satellite obtains information about a to-be-switched beam.

In a possible implementation, request information of all terminals in a same beam is sent by using a same time frequency resource, and includes same data. The request information has characteristics of a simple signal structure and a relatively short signal length. When the satellite detects request information of any terminal in the beam, it is considered that a "terminal call" is discovered. In this form in which used terminals send same request information, the same request information transmitted by different terminals is superimposed. This helps the satellite use a simple detection method, so that the request information can be detected more easily, and processing complexity and data processing power consumption of a network side are reduced.

In a possible implementation, the request information may be obtained by scrambling a preamble and a scrambling sequence, so that the satellite distinguishes between request messages that are from different beams and whose request objects are different satellites. This may be expressed in the following form:

$$C_{request,k}(n) = S_{pre,m}(n) \times C_{pre,i}(n)$$

$C_{pre,i}(n)$ is an original preamble sequence, $S_{pre,m}(n)$ is a scrambling code of the preamble sequence, and $C_{request,k}(n)$ is a scrambled preamble sequence sent by the terminal.

In a possible implementation, the satellite called by the terminal, the satellite cell in which the terminal is located, and the beam information may be indicated by using one or more of a time frequency location of the preamble sequence, a preamble sequence index, and a scrambling code sequence index. For example, in a beam k of a cell m under a satellite numbered i, a preamble sequence i may be scrambled by using an $m^{th}$ scrambling code $S_{pre,m}$, and a signal is sent on a $k^{th}$ time frequency resource.

In a possible implementation, the terminal periodically sends request information to the satellite. For example, after sending the request information, the terminal sends call information again at an interval of a period of time, for example, at an interval of K data frames, until the following case occurs: (a) A beam status corresponding to a location of a terminal changes, that is, when the beam status indicated by the level-1 broadcast signal changes, or the terminal can successfully obtain the level-2 broadcast signal, the terminal stops sending the request information; or (b) a terminal reaches a maximum quantity of sending times, for example, the maximum quantity of sending times may be represented by request-transmissionMax, that is, a threshold is preset. When a quantity of sending times exceeds the specified threshold, the terminal stops sending the request information.

S320: The satellite sends the level-2 broadcast signal, and the terminal obtains the level-2 broadcast signal.

A beam status corresponding to the level-2 broadcast signal is the broadband communication state.

When the terminal is located in a coverage area of a specific beam of a specific satellite, the satellite may send two different broadcast signals to the terminal. One is the level-1 broadcast signal. The other is the level-2 broadcast signal, the signal is a broadcast signal sent by the satellite after the satellite receives the request information sent by the terminal, and a beam status corresponding to the signal is the broadband communication state. When being in this state, the satellite may schedule a broadband communication service channel, and has a capability of processing a network access request of the terminal and a specific communication service. The terminal may perform high-throughput and high-performance communication with the satellite within a coverage area of the beam in the broadband communication state, for example, perform an NR-related communication service.

It should be understood that power of the beam in the energy saving state is far lower than power of the beam in broadband communication. In this case, the transmit power of the level-1 broadcast signal should be far lower than transmit power of the level-2 broadcast signal. For example, the transmit power of the level-1 broadcast signal is at least 10 dB lower than the transmit power of the level-2 broadcast signal. In addition, to ensure close synchronization performance when the terminal obtains the level-1 broadcast signal or the level-2 broadcast signal, level-1 broadcast signals or level-2 broadcast signals received by the terminal from a same satellite have similar CNRs. Therefore, the level-1 broadcast signal and the level-2 broadcast signal may be designed differently in aspects such as sending bandwidth, sending time, waveform design, and the like, to meet the foregoing requirements.

In a possible implementation, periods in which the satellite sends the level-1 broadcast signal and the level-2 broadcast signal are 1:N, where N is a positive integer greater than or equal to 2. It can be learned that, compared with the level-1 broadcast signal, the level-2 broadcast signal is sent at a lower frequency. In other words, in most of the time, the beam status is in the energy saving state with low energy consumption, thereby further reducing power consumption of the satellite.

S330: The terminal communicates with the satellite based on the level-2 broadcast signal.

After receiving the level-2 broadcast signal sent by the satellite, the terminal starts to perform a random access process, and attempts to access a satellite communication network to perform broadband communication.

Due to a process in which the terminal initiates a communication request to the satellite and the satellite switches the beam status to communicate with the terminal, a problem of a relatively large communication delay may be caused. In a scenario that is sensitive to a communication delay, the satellite may select a method for periodically sending a level-1 broadcast signal and a level-2 broadcast signal at intervals to reduce the communication delay. The level-1 broadcast signal and the level-2 broadcast signal have different sending periods. Generally, in most satellite communication scenarios, a sending period of the level-2 broadcast signal should be greater than a sending period of the level-1 broadcast signal. The satellite alternately sends two types of broadcast signals based on respective periods. The sending periods or sending period ratios of the two types of broadcast signals may be agreed on in advance, or may be adjusted by the satellite based on an actual network status or a satellite coverage area. When adjusting the sending periods or the sending period ratios of the level-1 broadcast signal and the level-2 broadcast signal, the satellite may determine information such as a beam coverage area based on a historical or current terminal access record or ephemeris information, to flexibly adjust the sending ratios and the sending periods of the level-1 broadcast signal and the level-2 broadcast signal, thereby reducing a communication delay.

Figure 4:
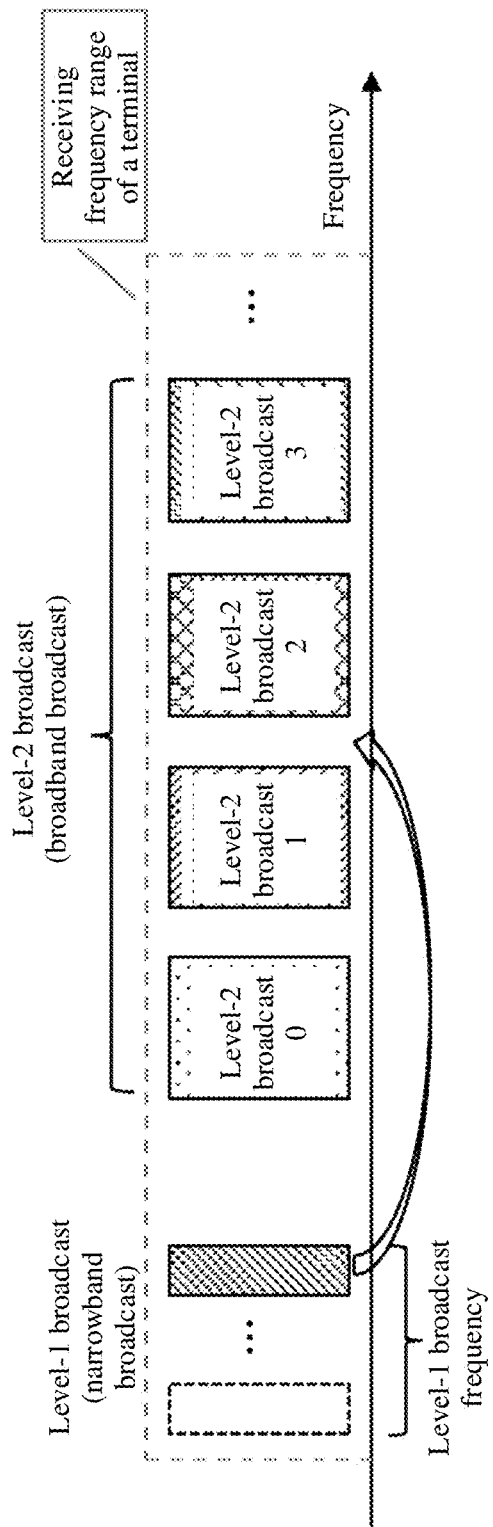
FIG. 4 is a schematic diagram of a frequency domain relationship between a level-1 broadcast signal and a level-2 broadcast signal according to an embodiment of this application.

In a possible implementation, as shown in FIG. 4, the level-1 broadcast signal further includes information about a sending frequency of the level-2 broadcast signal; or a sending frequency of the level-1 broadcast signal is in a one-to-one mapping relationship with a sending frequency of the level-2 broadcast signal.

Because the beam in the broadband communication state may simultaneously send the level-1 broadcast signal and the level-2 broadcast signal, the sending frequency of the level-1 broadcast signal and that of the level-2 broadcast signal cannot overlap. In addition, to reduce complexity of searching for the frequency of the level-2 broadcast signal by the terminal, the mapping relationship between the level-1 broadcast signal and the level-2 broadcast signal may be agreed on. In other words, the sending frequency of the level-2 broadcast signal may be directly or indirectly obtained from the level-1 broadcast signal.

Generally, the sending frequency of the level-1 broadcast signal is located on a specific agreed frequency, or is located on a specific group of agreed frequencies that are discretely distributed in a form of a synchronization grid.

For example, the sending frequency of the level-2 broadcast signal may be deduced based on the sending frequency of the level-1 broadcast signal and an agreed calculation formula. For example, it is assumed that $f_{1,min}$ is a minimum possible sending frequency of the level-1 broadcast signal, $f_{2,min}$ is a minimum possible sending frequency of the level-2 broadcast signal, and $\Delta f_{1,2}$ is a difference between the minimum possible sending frequency of the level-1 broadcast signal and the minimum possible sending frequency of the level-2 broadcast signal. If the minimum possible sending frequency of the level-1 broadcast signal is known, the minimum possible sending frequency of the level-2 broadcast signal may be calculated according to an equation $f_{2,min}=f_{1,min}+\Delta f_{1,2}$.

For example, the sending frequency of the level-2 broadcast signal may alternatively be indicated in the level-1 broadcast signal. In other words, the level-1 broadcast signal may directly indicate a sending frequency/sending frequencies of one or more level-2 broadcast signals corresponding to the beam, or may directly indicate a sending frequency of one of level-2 broadcast signals corresponding to the beam, and then a sending frequency of another level-2 broadcast signal is deduced in an agreed manner. For example, the level-1 broadcast signal indicates a sending frequency $f_{2,min}$ of a minimum level-2 broadcast signal corresponding to the beam, as shown in an equation $f_2=f_{2,min}+n \cdot \Delta f_2$, $n=0, 1, \ldots, N_{max}$; in this case, another sending frequency of the level-2 broadcast signal may be determined by $f_{2,min}$ and a distribution interval $\Delta f_2$ of the sending frequency of the level-2 broadcast signal.

In a possible implementation, the level-1 broadcast signal further includes time domain synchronization information of the level-2 broadcast signal.

In other words, the level-1 broadcast signal includes the synchronization code, and is aligned with a timeslot of the level-2 broadcast signal. Therefore, the terminal may obtain some synchronization information from the level-1 broadcast signal, to quickly complete time domain synchronization with the level-2 broadcast signal.

Figure 5:
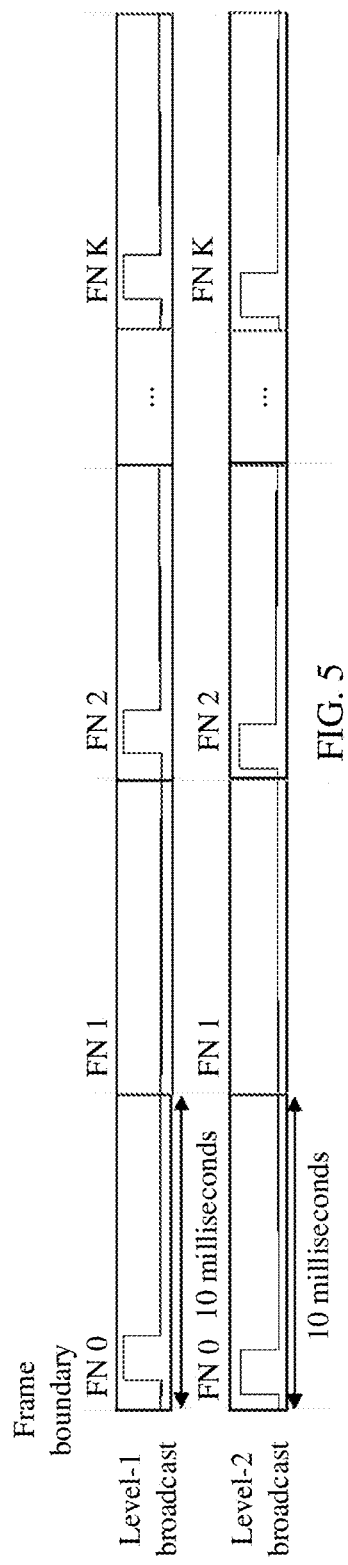
FIG. 5 is a schematic diagram of a time domain relationship between a level-1 broadcast signal and a level-2 broadcast signal according to an embodiment of this application.

Generally, frame boundaries of the level-1 broadcast signal and the level-2 broadcast signal may be set to be aligned. For example, as shown in FIG. 5, frame lengths of both the level-1 broadcast signal and the level-2 broadcast signal are set to 10 milliseconds, and the terminal may obtain frame synchronization information in a process of receiving the level-1 broadcast signal. In addition, in consideration of a small data volume of the level-1 broadcast signal and saving of sending power consumption, the level-1 broadcast signal may be sent in a burst form, and a burst period of the level-1 broadcast signal and that of the level-2 broadcast signal may be the same or different. This is not limited herein. In addition, when the level-1 broadcast signal is sent in the burst form, signal interference between satellite beams may be further avoided in a time division manner. For example, a relationship between a start location of the burst period of the level-1 broadcast signal and a frame boundary may be derived based on the beam number of the satellite, as shown in: frame_boundary=burst_start-beamID*$T_{burst}$, $T_{burst}$=1, 2, ... ms, where frame_boundary is the frame boundary, burst_start is the start location of the burst period of the level-1 broadcast signal, beamID is the beam number, and $T_{burst}$ is the burst period.

The following specifically describes a procedure in which a terminal calls a satellite to schedule a broadband communication beam.

Figure 6:
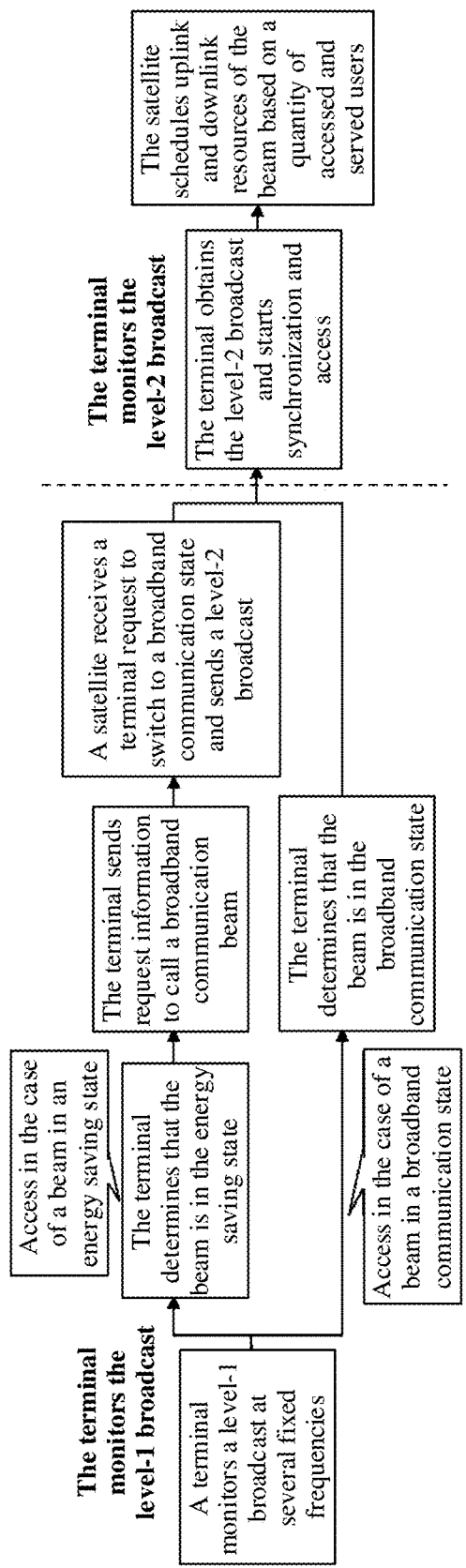
FIG. 6 is a schematic flowchart of a method for dynamically scheduling a beam according to an embodiment of this application.

FIG. 6 is a flowchart of dynamic beam scheduling according to an embodiment of this application. As shown in FIG. 6, the procedure is divided into two phases: a phase in which the terminal monitors a level-1 broadcast signal and a phase in which the terminal monitors a level-2 broadcast signal. When the terminal actively initiates a communication request, the terminal first monitors the level-1 broadcast signal at several fixed frequencies. The level-1 broadcast signal includes status information of a satellite beam. When the terminal determines that a status of the beam is an energy saving state, the terminal sends a request message to the satellite, to request the satellite to convert a status of a beam corresponding to a location of the terminal into a broadband communication state. After the beam status is successfully converted, the satellite starts to send the level-2 broadcast signal. After detecting the level-2 broadcast signal, the terminal starts a downlink synchronization and random access process. When determining that the beam status is the broadband communication state, the terminal directly jumps to monitor the level-2 broadcast signal, and starts the downlink synchronization and random access process. For a beam in the broadband communication state, uplink and downlink resources may be further flexibly scheduled based on a current quantity of accessed and served users.

Figure 7:
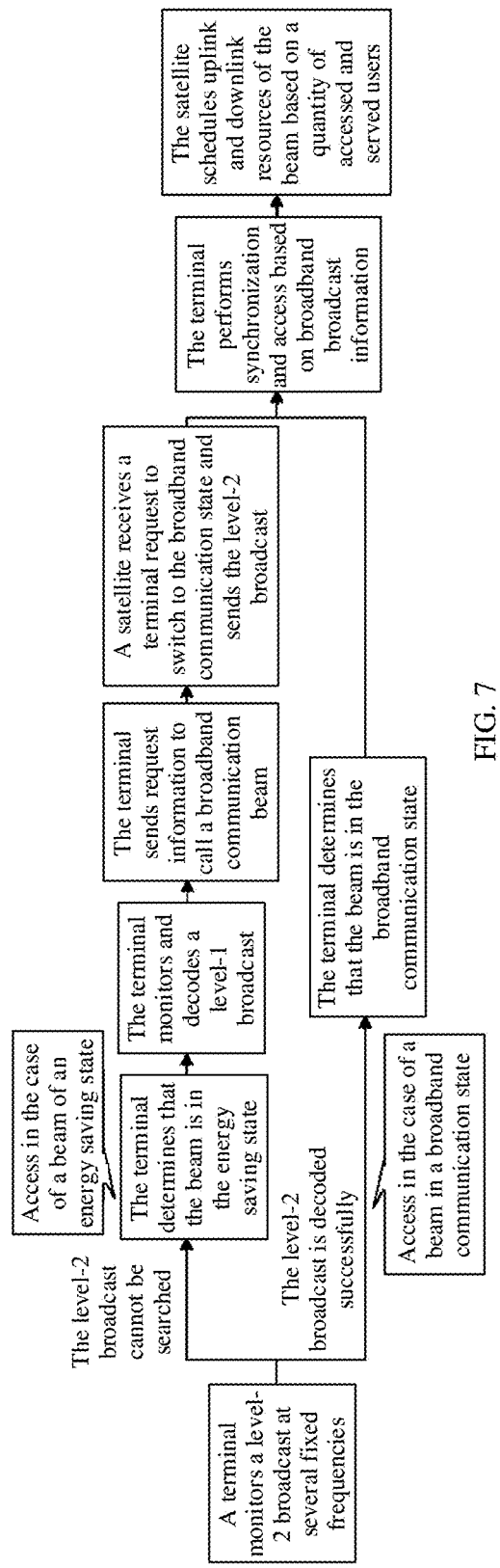
FIG. 7 is a schematic flowchart of another method for dynamically scheduling a beam according to an embodiment of this application.

FIG. 7 is another flowchart of dynamic beam scheduling according to an embodiment of this application. A difference from the procedure shown in FIG. 6 lies in that when a terminal actively initiates a communication request, the terminal first monitors a level-2 broadcast signal on several fixed frequencies. When the terminal cannot find the level-2 broadcast signal through searching, the terminal determines that a current beam is in an energy saving state, and the terminal jumps to monitor a level-1 broadcast signal and obtains necessary satellite beam information. Then, the terminal sends request information to a satellite, to request the satellite to convert a status of a beam corresponding to a location of the terminal into a broadband communication state. After the beam status is successfully converted, the satellite starts to send the level-2 broadcast signal. After detecting the level-2 broadcast signal, the terminal starts a downlink synchronization and random access process. When the terminal can successfully decode the level-2 broadcast signal, the terminal determines that the current beam is in the broadband communication state, and starts the downlink synchronization and random access process. Similarly, for the beam in the broadband communication state, uplink and downlink resources may be flexibly scheduled based on a current quantity of accessed and served users.

Particularly, when the terminal calls the satellite to schedule a broadband communication beam based on the procedure shown in FIG. 7, only the level-1 broadcast signal is sent when the beam is in the energy saving state, and only the level-2 broadcast signal is sent when the beam is in the broadband communication state. Therefore, only the level-1 broadcast signal needs to be continuously sent at a fixed frequency and period in the beam in the energy saving state. Because the level-1 broadcast signal and the level-2 broadcast signal are not sent at the same time, sending frequencies of the level-1 broadcast signal and the level-2 broadcast signal may overlap.

In a possible implementation, there is further a paging scenario in which the satellite searches for a terminal. In this case, the terminal passively communicates with the satellite. A terminal that can be paged by the satellite needs to be registered with a network in advance. During network registration, the terminal reports geographical location information at that time. In a subsequent process, if a moving distance of the terminal reaches a specified threshold, the terminal needs to actively report a geographical location again, so that the satellite updates the location information of the terminal. When the satellite pages the terminal, a status of a beam to which a corresponding satellite belongs may be switched based on geographical location information of the terminal, and a paging message is delivered. The terminal periodically detects the paging message. Herein, a paging information detection period may be longer than a detection period of a cellular network.

As described in the foregoing embodiments, in this embodiment of this application, based on consideration of limited satellite energy sources and extremely unbalanced distribution of satellite communication services, a solution in which the terminal calls the satellite and the satellite dynamically schedules a broadband communication service beam in a scenario in which satellite communication supplements coverage of a cellular network is designed. In this solution, in a manner in which the terminal calls the satellite, the satellite dynamically schedules the broadband communication service beam, to maximize utilization of a satellite beam communication resource. A broadband communication function of a specific satellite beam is enabled only after the terminal calls, and is disabled at another time and in the energy saving state. In this state, only an energy saving broadcast signal is periodically sent, thereby significantly reducing satellite power consumption. In addition, in a manner in which the terminal calls the satellite beam, beam scheduling flexibility is improved.

The following provides a specific manner of controlling satellite beam state transition in a specific embodiment.

Figure 8:
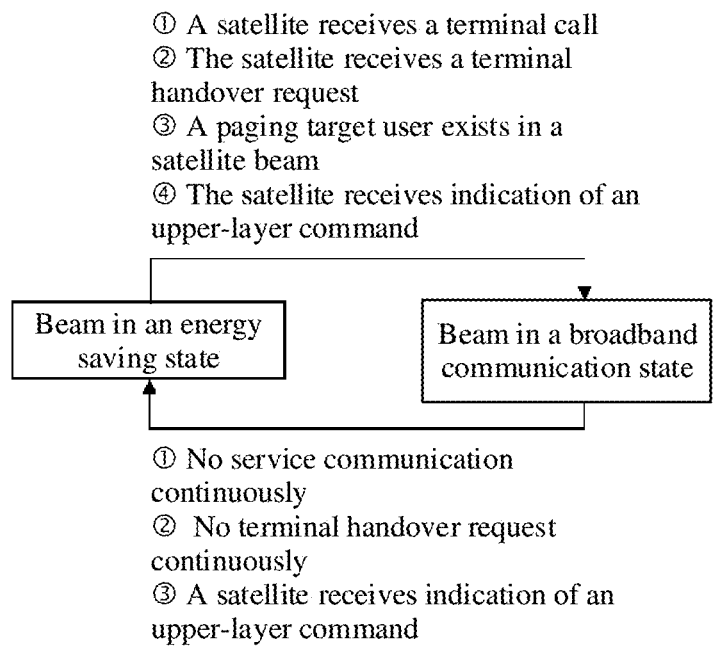
FIG. 8 is a schematic diagram of satellite beam state transition according to an embodiment of this application.

It can be learned from the foregoing embodiment that the beam status of the satellite switches back and forth between the energy saving state and the broadband communication state. When the terminal has a communication service requirement, after sending the request information to the satellite, the satellite should schedule a beam of a broadband communication service in time, that is, switch the beam status to the broadband communication state. When the terminal no longer needs communication or a service ends, the satellite should disable the broadband communication service of the beam in time, that is, switch the beam status to the energy saving state. However, when the beam is switched from the energy saving state to the broadband communication state, or is switched from the broadband communication state to the energy saving state, there is a specific beam state transition condition, as shown in FIG. 8.

When the satellite beam is switched from the energy saving state to the broadband communication state, a main reason is that a requirement for communicating with a terminal located in a service range of the beam is generated. The beam state transition condition may include but is not limited to: The satellite obtains request information of the terminal; or the satellite obtains a handover request of the terminal; or the satellite discovers a paging target terminal; or the satellite obtains an upper-layer instruction for forcibly switching to the broadband communication state.

That is, when the satellite obtains request information of at least one terminal, or the satellite obtains the handover request or scheduling information of the terminal, the handover request herein refers to an application that the terminal in a connected mode is about to be handed over to a specific beam coverage area. The application may be sent by the terminal, or may be sent by another satellite or a cooperative base station of the current satellite. Alternatively, when a paging target user exists in the satellite beam, or the satellite obtains an upper-layer instruction and the instruction is used to instruct the satellite to forcibly switch to the broadband communication state, the beam status is switched from the energy saving state to the broadband communication state. It can be learned that the broadband communication service is enabled in a manner in which the terminal calls the satellite and the satellite performs scheduling, so that utilization of a communication resource of the satellite beam can be maximized. In addition, the broadband communication service of the beam is enabled only when the terminal in the coverage area has a communication requirement, so that use based on demand is implemented and power consumption of the satellite is significantly reduced.

When the satellite beam is switched from the broadband communication state to the energy saving state, correspondingly, a main reason is that there is no need to communicate with the terminal located in the service range of the beam. The beam state transition condition may include but is not limited to: The satellite obtains no broadband communication service within a preset time threshold; or the satellite obtains no handover request of the terminal within a preset time threshold; or the satellite obtains an upper-layer instruction for forcibly switching to the energy saving state.

That is, when there is no broadband communication service or no terminal in a connected mode in the beam for a period of time, the beam status is switched to the energy saving state; or when no scheduling information or handover request indicating the terminal in a connected mode to enter the coverage area of the beam exists in the beam for a period of time, the beam status is switched to the energy saving state; or when the beam receives an upper-layer instruction and the instruction is used to instruct to forcibly switch to the energy saving state, the beam is switched to the energy saving state. It can be learned that when there is no longer a need to communicate with the terminal located in the service range of the beam, the beam is switched to the energy saving state, flexibility is achieved to some extent, and power consumption of the satellite is significantly reduced.

In a possible implementation, a process of switching the beam status from the broadband communication state to the energy saving state may be controlled by using two timers. For example, the timers are a first timer and a second timer. The first timer is also referred to as a transmission timer (transmissionTimer), and the second timer is also referred to as a handover timer (handoverTimer). The transmissionTimer is started or restarted when request information or terminal service data is obtained. The handoverTimer is started or restarted when an application of handover of the terminal in the connected mode to a beam service area is obtained. The beam status is switched from the broadband communication state to the energy saving state after both the transmissionTimer and the handoverTimer expire.

It should be understood that a name of the timer is not limited herein, and provided that a function of the timer can be implemented, the timer is a protected object in this embodiment of this application.

Figure 9:
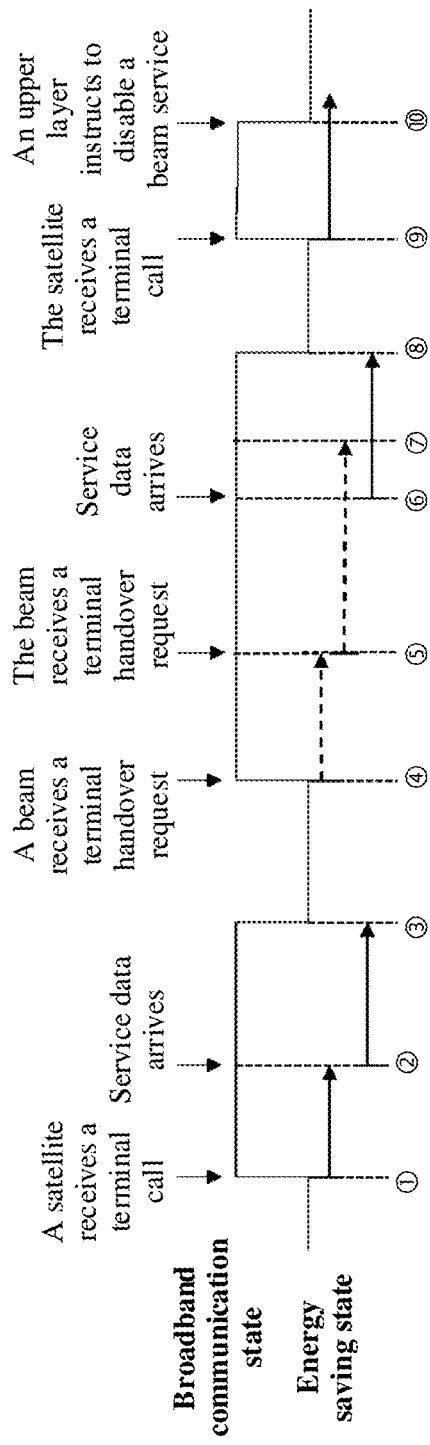
FIG. 9 is a schematic diagram of controlling beam state transition by using a timer according to an embodiment of this application.

For example, FIG. 9 is a schematic diagram of controlling beam state transition by using a timer. The following describes, by using an example, a specific method in which the timer is used to control a beam to switch from a broadband communication state to an energy saving state. As shown in FIG. 9, at a moment ①, a satellite receives request information from a terminal, switches to the broadband communication state, and starts a transmissionTimer; at a moment ②, service data of the terminal arrives, and the transmissionTimer is restarted; at a moment ③, the transmissionTimer expires, a handoverTimer is not started at this moment, and the beam is switched to the energy saving state; at a moment ④, the satellite receives a scheduling request that the terminal in a connected mode is about to be handed over to a service range of the beam, switches to the broadband communication state, and starts the handoverTimer; at moment ⑤, the satellite receives a scheduling request that the terminal in a connected mode is about to be handed over to a service range of the beam again, and restarts the handoverTimer; at moment ⑥, service data of the terminal arrives, and the transmissionTimer is started; at moment ⑦, the handoverTimer expires, the transmissionTimer does not expire, and a beam status remains unchanged; at moment ⑧, the transmissionTimer expires, both the transmissionTimer and the handoverTimer expire at this moment, and the beam is switched to the energy saving state; at moment ⑨, the satellite receives call information of the terminal, switches to the broadband communication state, and starts the transmissionTimer; at moment ⑩, the satellite receives an uplink command, directly disables a broadband communication service of the beam, and switches to the energy saving state.

In a possible implementation, when the terminal in the connected mode enters a coverage area of another satellite or another cooperative base station, the current satellite sends signaling to the satellite or the cooperative base station, where the signaling indicates the satellite or the cooperative base station to switch the beam status to the broadband communication state. For example, content of the signaling is shown as follows:

Beam-Mode-Config information element
-- ASN1START
-- TAG-BEAM-MODE-CONFIG-START

-continued

```
Beam-Mode-Config :: =   SEQUENCE {
    Cell-ID           INTEGER (...)
    Beam-ID           INTEGER (0,1,2,...,63)
    BroadBandService      BOOLEAN
}
-- TAG-BEAM-MODE-CONFIG-STOP
-- ASN1STOP
```

That is, because the satellite is in a constantly moving state, there may be a scenario in which the terminal is about to be out of the service range of the current satellite. That is, when the terminal is about to enter a service range of another satellite or a service range of another cooperative base station, the current satellite may indicate, in a signaling manner, a next satellite or cooperative base station to start a corresponding broadband communication service, to ensure that the terminal in the connected mode can continuously perform the broadband communication service, thereby avoiding a phenomenon that the terminal cannot perform broadband communication temporarily.

A specific method for controlling satellite beam state transition is provided in the foregoing embodiment. A broadband communication service beam is enabled in a manner in which the terminal calls the satellite and the satellite performs scheduling, so that utilization of a satellite beam communication resource can be maximized. A broadband communication service of a specific satellite beam is enabled only when there is a need to communicate with a terminal in a service area, and a broadband communication function during a no-service period is disabled by using the timer, flexibility is achieved to some extent and satellite power consumption is significantly reduced.

The foregoing mainly describes the solutions provided in embodiments of this application from the perspective of interaction between network elements. Correspondingly, embodiments of this application further provide a communication apparatus. The communication apparatus may be the network element in the foregoing method embodiments, or an apparatus including the foregoing network element, or a component that can be used in the network element. It may be understood that, to implement the foregoing functions, the communication apparatus includes a corresponding hardware structure and/or software module for performing the functions. A person skilled in the art should be easily aware that units, algorithms, and steps in the examples described with reference to embodiments disclosed in this specification can be implemented in a form of hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

An embodiment of this application further provides a communication apparatus 1000. The communication apparatus 1000 may be a terminal device or a network device, or may be an apparatus in a terminal device or a network device, or may be an apparatus that can match a terminal device or a network device for use. In a possible implementation, the communication apparatus 1000 may include modules or units that one to one correspond to the methods/operations/steps/actions performed by the terminal device in the foregoing method embodiments. The units may be hardware circuits, software, or may be implemented by a hardware circuit in combination with software. In a possible implementation, the apparatus 1000 may include a transceiver unit 1010 and a processing unit 1020. The transceiver unit 1010 may communicate with the outside, and the processing unit 1020 is configured to process data. The transceiver unit 1010 may also be referred to as a communication interface or a communication unit.

When the communication apparatus 1000 is configured to perform an operation performed by the terminal, in a possible implementation, the transceiver unit 1010 and the processing unit 1020 may be further configured to perform the following steps in the foregoing method. Examples are as follows:

In a possible implementation, the processing unit 1020 is configured to determine a type of a broadcast signal.

The transceiver unit 1010 is configured to obtain a level-1 broadcast signal, where a beam status corresponding to the level-1 broadcast signal is an energy saving state, and the level-1 broadcast signal includes synchronization information.

The transceiver unit 1010 is further configured to obtain a level-2 broadcast signal, where a beam status corresponding to the level-2 broadcast signal is a broadband communication state.

The transceiver unit 1010 is further configured to perform communication based on the level-2 broadcast signal.

In a possible implementation, before the transceiver unit 1010 obtains the level-2 broadcast signal, the transceiver unit 1010 sends request information, where the request information is used to request a satellite to send the level-2 broadcast signal.

In a possible implementation, when the beam status is in the energy saving state, the transceiver unit 1010 can obtain only the level-1 broadcast signal and/or send request information; or when the beam status is in the broadband communication state, the processing unit 1020 has capabilities of accessing a network request and performing a specific communication service.

In a possible implementation, the request information includes at least one of the following: a satellite number called by the transceiver unit 1010, a satellite cell number, and a beam number.

In a possible implementation, the transceiver unit 1010 periodically sends request information to the satellite until a beam status corresponding to a location of the transceiver unit 1010 changes.

When the communication apparatus 1000 is configured to perform an operation performed by the network device, in an embodiment, the transceiver unit 1010 and the processing unit 1020 may be configured to perform the following steps in the foregoing method. Examples are as follows:

The processing unit 1020 determines a level-1 broadcast signal.

The transceiver unit 1010 sends the level-1 broadcast signal, where a beam status corresponding to the level-1 broadcast signal is an energy saving state, and the level-1 broadcast signal includes synchronization information.

The processing unit 1020 determines a level-2 broadcast signal.

The transceiver unit 1010 sends the level-2 broadcast signal, where a beam status corresponding to the level-2 broadcast signal is a broadband communication state.

In a possible implementation, before the transceiver unit 1010 sends the level-2 broadcast signal, the transceiver unit 1010 obtains request information, where the request information is used to request the transceiver unit 1010 to send the level-2 broadcast signal.

In a possible implementation, when the beam status is in the energy saving state, the transceiver unit 1010 can send only the level-1 broadcast signal and/or obtain request information; or when the beam status is in the broadband communication state, the processing unit 1020 has capabilities of processing a network access request and performing a specific communication service.

In a possible implementation, a trigger condition for switching the beam status from the energy saving state to the broadband communication state includes any one or more of the following: Request information of the terminal is obtained; or a handover request of the terminal is obtained; or a paging response of a target terminal is obtained; or an upper-layer instruction for forcibly switching to the broadband communication state is obtained.

In a possible implementation, a trigger condition for switching the beam status from the broadband communication state to the energy saving state includes any one or more of the following: No broadband communication service is obtained within a preset time threshold; or no handover request of the terminal is obtained within a preset time threshold; or an upper-layer instruction for forcibly switching to the energy saving state is obtained.

In a possible implementation, when the terminal in a connected mode enters a coverage area of another satellite or a cooperative base station, the current transceiver unit 1010 sends signaling to the another satellite or the cooperative base station, where the signaling indicates a beam status of the another satellite or the cooperative base station to switch to the broadband communication state.

It should be noted that the transceiver unit 1010 is further configured to perform other receiving or sending steps or operations performed by the terminal and the network device in the foregoing method embodiments. The processing unit 1020 may be further configured to perform corresponding steps or operations, other than receiving and sending, performed by the terminal and the network device in the foregoing method embodiments. Details are not described herein again.

Figure 10:
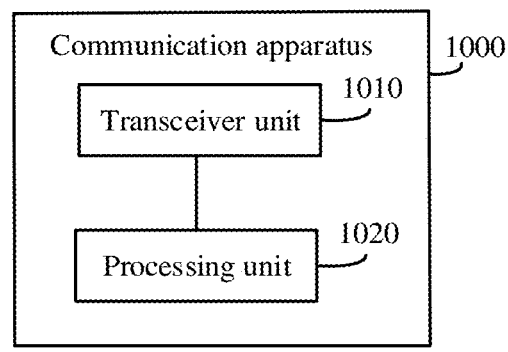
FIG. 10 is a schematic diagram of a structure of a communication apparatus according to an embodiment of this application.

It should be understood that FIG. 10 is merely an example instead of a limitation. The terminal device including the transceiver unit and the processing unit may not depend on the structure shown in FIG. 10.

When the apparatus 1000 is a chip, the chip includes a transceiver unit and a processing unit. The transceiver unit may be an input/output circuit or a communication interface. The processing unit may be a processor, a microprocessor, or an integrated circuit that is integrated on the chip.

In this embodiment, the apparatus 1000 is presented in a form in which functional units are obtained through division in an integrated manner. The "module" herein may be an application-specific integrated circuit, a processor and a memory that execute one or more software or firmware programs, an integrated logic circuit, and/or another component that can provide the foregoing functions.

Figure 11:
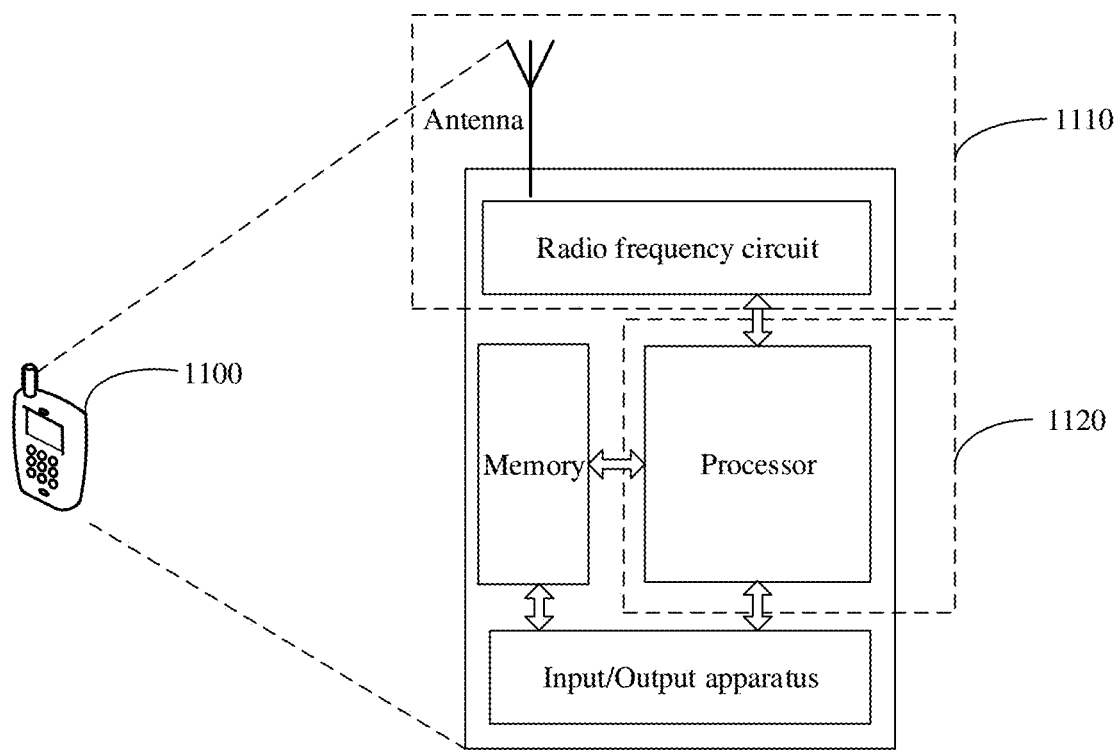
FIG. 11 is a schematic diagram of a structure of a terminal device according to an embodiment of this application.

FIG. 11 is a simplified schematic diagram 1100 of a terminal. For ease of understanding and illustration, in FIG. 11, a mobile phone is used as an example of the terminal. As shown in FIG. 11, the terminal includes a processor, a memory, a radio frequency circuit, an antenna, and an input/output apparatus. The processor is mainly configured to: process a communication protocol and communication data, control the terminal, execute a software program, process data of the software program, and the like. The memory is mainly configured to store a software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminals may not have the input/output apparatus.

When data needs to be sent, the processor performs baseband processing on the to-be-sent data, and then outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 11 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, an antenna having sending and receiving functions and the radio frequency circuit may be considered as a receiving unit and a sending unit (which may also be collectively referred to as a transceiver unit) of the terminal, and a processor having a processing function may be considered as a processing unit of the terminal. As shown in FIG. 11, the terminal includes a transceiver unit 1110 and a processing unit 1120. The transceiver unit 1110 may alternatively be referred to as a receiver/transmitter (sender), a receiver/transmitter machine, a receiver/transmitter circuit, or the like. The processing unit 1120 may also be referred to as a processor, a processing board, a processing module, a processing apparatus, or the like. The transceiver unit 1110 and the processing unit 1120 may be configured to perform actions of the terminal in the foregoing method embodiments, for example:

In a possible implementation, the processing unit 1120 is configured to determine a type of a broadcast signal.

The transceiver unit 1110 is configured to obtain a level-1 broadcast signal, where a beam status corresponding to the level-1 broadcast signal is an energy saving state.

The level-1 broadcast signal includes synchronization information.

The transceiver unit 1110 is further configured to obtain a level-2 broadcast signal, where a beam status corresponding to the level-2 broadcast signal is a broadband communication state.

The transceiver unit 1110 is further configured to perform communication based on the level-2 broadcast signal.

In a possible implementation, before the transceiver unit 1110 obtains the level-2 broadcast signal, the transceiver unit 1110 sends request information, where the request information is used to request a satellite to send the level-2 broadcast signal.

In a possible implementation, when the beam status is in the energy saving state, the transceiver unit 1010 can obtain only the level-1 broadcast signal and/or send request information; or when the beam status is in the broadband communication state, the processing unit 1020 has capabilities of accessing a network request and performing a specific communication service.

In a possible implementation, the request information includes at least one of the following: a satellite number called by the transceiver unit 1110, a satellite cell number, and a beam number.

In a possible implementation, the transceiver unit 1110 periodically sends request information to the satellite until a beam status corresponding to a location of the transceiver unit 1110 changes.

All related content and beneficial effects of the steps in the foregoing implementations may be cited in function descriptions of corresponding functional components. Details are not described herein again.

Figure 12:
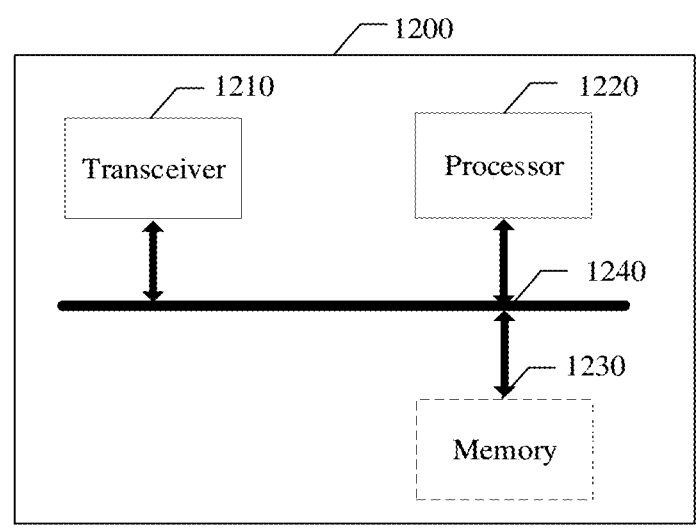
FIG. 12 is a schematic diagram of a structure of a network device according to an embodiment of this application.

As shown in FIG. 12, an embodiment of this application further provides an apparatus 1200. The apparatus 1200 is configured to implement functions of the network device in the foregoing method. The apparatus may be a network device, may be an apparatus in the network device, or may be an apparatus that can be used together with the network device. The apparatus 1200 may be a chip system. In this embodiment of this application, the chip system may include a chip, or may include a chip and another discrete component. The apparatus 1200 includes at least one processor 1220, configured to implement the functions of the network device in the method provided in embodiments of this application. The apparatus 1200 may further include a transceiver 1210.

The apparatus 1200 may be specifically configured to perform a related method performed by the network device in the foregoing method embodiment. The network device is, for example, a satellite.

The processor 1220 determines a level-1 broadcast signal.

The transceiver 1210 sends the level-1 broadcast signal, where a beam status corresponding to the level-1 broadcast signal is an energy saving state.

The level-1 broadcast signal includes synchronization information.

The processor 1220 determines a level-2 broadcast signal.

The transceiver 1210 sends the level-2 broadcast signal, where a beam status corresponding to the level-2 broadcast signal is a broadband communication state.

In a possible implementation, before the transceiver 1210 sends the level-2 broadcast signal, the transceiver 1210 obtains request information, where the request information is used to request the transceiver 1210 to send the level-2 broadcast signal.

In a possible implementation, when the beam status is in the energy saving state, the transceiver 1210 can send only the level-1 broadcast signal and/or obtain request information; or when the beam status is in the broadband communication state, the processor 1020 has capabilities of processing a network access request and performing a specific communication service.

In a possible implementation, a trigger condition for switching the beam status from the energy saving state to the broadband communication state includes any one or more of the following: request information of the terminal is obtained; or a handover request of the terminal is obtained; or a paging response of a target terminal is obtained; or an upper-layer instruction for forcibly switching to the broadband communication state is obtained.

In a possible implementation, a trigger condition for switching the beam status from the broadband communication state to the energy saving state includes any one or more of the following: No broadband communication service is obtained within a preset time threshold; or no handover request of the terminal is obtained within a preset time threshold; or an upper-layer instruction for forcibly switching to the energy saving state is obtained.

In a possible implementation, when the terminal in a connected mode enters a coverage area of another satellite or a cooperative base station, the current transceiver 1210 sends signaling to the another satellite or the cooperative base station, where the signaling indicates a beam status of the another satellite or the cooperative base station to switch to the broadband communication state.

The apparatus 1200 may further include at least one memory 1230, configured to store program instructions and/or data. The memory 1230 is coupled to the processor 1220. The coupling in this embodiment of this application may be an indirect coupling or a communication connection between apparatuses, units, or modules. The coupling may be implemented in electronic, mechanical, and other forms, and is used for information exchange between the apparatuses, the units, or the modules. The processor 1220 may operate cooperatively with the memory 1230. The processor 1220 may execute the program instructions stored in the memory 1230. In a possible implementation, at least one of the at least one memory may be integrated with the processor. In another possible implementation, the memory 1230 is located outside the apparatus 1200.

In this embodiment of this application, a specific connection medium between the transceiver 1210, the processor 1220, and the memory 1230 is not limited. In this embodiment of this application, in FIG. 12, the memory 1230, the processor 1220, and the transceiver 1210 are connected by using a bus 1240, and the bus is represented by using a bold line in FIG. 12. A connection manner between other components is merely used as an example for description, and does not limit the present invention. The bus may be classified into an address bus, a data bus, a control bus, and the like. For ease of representation, only one bold line is for representing the bus in FIG. 12, but this does not mean that there is only one bus or only one type of bus.

In this embodiment of this application, the processor 1220 may be one or more central processing units (CPU). When the processor 1220 is one CPU, the CPU may be a single-core CPU or a multi-core CPU. The processor 1220 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by using a combination of hardware in the processor and a software module.

In this embodiment of this application, the memory 1230 may include but is not limited to a non-volatile memory such as a hard disk drive (HDD) or a solid-state drive (SSD), a random access memory (RAM), an erasable programmable read-only memory (EPROM), a read-only memory (ROM), a portable read-only memory (CD-ROM), or the like. The memory is any other medium that can carry or store expected program code in a form of an instruction structure or a data structure and that can be accessed by a computer, but is not limited thereto. The memory in embodiments of this application may alternatively be a circuit or any other apparatus that can implement a storage function, and is configured to store the program instructions and/or the data. The memory 1230 is configured to store a related instruction and related data.

Figure 13:
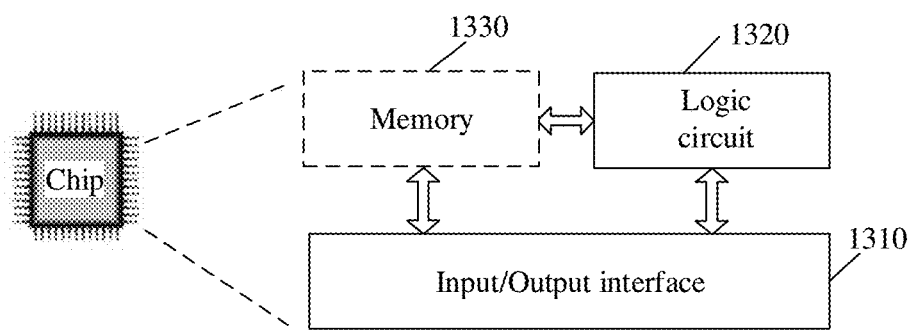
FIG. 13 is a schematic diagram of a structure of a chip according to an embodiment of this application.

As shown in FIG. 13, an embodiment of this application further provides an apparatus 1300, configured to implement functions of the terminal device and the network device in the foregoing methods. The apparatus 1300 may be a communication apparatus or a chip in a communication apparatus. The apparatus includes:

at least one input/output interface 1310 and a logic circuit 1320. The input/output interface 1310 may be an input/output circuit, and the logic circuit 1320 may be a signal processor, a chip, or another integrated circuit that can implement the method in this application.

The apparatus 1300 may further include at least one memory 1330, configured to store program instructions and/or data. The memory 1330 is coupled to the logic circuit 1320. The coupling in this embodiment of this application may be an indirect coupling or a communication connection between apparatuses, units, or modules. The coupling may be implemented in electronic, mechanical, and other forms, and is used for information exchange between the apparatuses, the units, or the modules. The logic circuit 1320 may operate cooperatively with the memory 1330. The logic circuit 1320 may execute the program instructions stored in the memory 1330. In a possible implementation, at least one of the at least one memory may be integrated with the logic circuit. In another possible implementation, the memory 1330 is located outside the apparatus 1300.

The at least one input/output interface 1310 is configured to input or output a signal or data.

For example, when the apparatus is a terminal or is applied to a terminal, in an embodiment, the input/output interface 1310 is configured to input a level-1 broadcast signal, where a beam status corresponding to the level-1 broadcast signal is an energy saving state.

The level-1 broadcast signal includes synchronization information.

The input/output interface 1310 is further configured to input a level-2 broadcast signal, where a beam status corresponding to the level-2 broadcast signal is a broadband communication state.

The input/output interface 1310 is further configured to perform communication based on the level-2 broadcast signal.

In a possible implementation, before the input/output interface 1310 inputs the level-2 broadcast signal, the input/output interface 1310 outputs request information, where the request information is used to request a satellite to send the level-2 broadcast signal.

In a possible implementation, when the beam status is in the energy saving state, the input/output interface 1310 can input only the level-1 broadcast signal and/or output request information; or when the beam status is in the broadband communication state, the logic circuit 1320 has capabilities of accessing a network request and performing a specific communication service.

In a possible implementation, the request information includes at least one of the following: a satellite number, a satellite cell number, and a beam number.

In a possible implementation, the input/output interface 1310 periodically outputs the request information until a beam status corresponding to a location of the input/output interface 1310 changes.

For example, when the apparatus is a network device, in an embodiment, the input/output interface 1310 outputs a level-1 broadcast signal, where a beam status corresponding to the level-1 broadcast signal is an energy saving state, and the level-1 broadcast signal includes synchronization information.

The input/output interface 1310 outputs a level-2 broadcast signal, where a beam status corresponding to the level-2 broadcast signal is a broadband communication state.

In a possible implementation, before the input/output interface 1310 outputs the level-2 broadcast signal, the input/output interface 1310 inputs request information, where the request information is used to request the input/output interface 1310 to output the level-2 broadcast signal.

In a possible implementation, when the beam status is in the energy saving state, the input/output interface 1310 can output only the level-1 broadcast signal and/or obtain request information; or when the beam status is in the broadband communication state, the logic circuit 1320 has capabilities of processing a network access request and performing a specific communication service.

In a possible implementation, a trigger condition for switching the beam status from the energy saving state to the broadband communication state includes any one or more of the following: Request information of the terminal is input; or a handover request of the terminal is input; or a paging response of a target terminal is input; or an upper-layer instruction for forcibly switching to the broadband communication state is input.

In a possible implementation, a trigger condition for switching the beam status from the broadband communication state to the energy saving state includes any one or more of the following: No broadband communication service is input within a preset time threshold; or no handover request of the terminal is input within a preset time threshold; or an upper-layer instruction for forcibly switching to the energy saving state is input.

In a possible implementation, when the terminal in a connected mode enters a coverage area of another satellite or a cooperative base station, the current input/output interface 1310 outputs signaling to the another satellite or the cooperative base station, where the signaling indicates a beam status of the another satellite or the cooperative base station to switch to the broadband communication state.

The logic circuit 1320 is configured to perform a part or all of the steps in any one of the methods provided in embodiments of this application. The logic circuit may implement functions implemented by the processing unit 1020 in the apparatus 1000 and the processor 1110 in the apparatus 1100.

When the communication apparatus is a chip applied to a terminal device, the chip in the terminal device implements functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip applied to a network device, the chip in the network device implements functions of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

Based on a same concept as the foregoing method embodiments, an embodiment of this application further provides a computer-readable storage medium. The computer-readable storage medium stores a computer program. The computer program is executed by hardware (for example, a processor), to implement a part or all of the steps in any one of the methods performed by any apparatus in embodiments of this application.

Based on a same concept as the foregoing method embodiments, an embodiment of this application further provides a computer program product including instructions. When the computer program product runs on a computer, the computer is enabled to perform a part or all of the steps in any one of the methods in the foregoing aspects.

Based on a same concept as the foregoing method embodiments, this application further provides a chip or a chip system. The chip may include a processor. The chip may further include a memory (or a storage module) and/or a transceiver (or a communication module), or the chip is coupled to a memory (or a storage module) and/or a transceiver (or a communication module). The transceiver (or the communication module) may be configured to support the chip in wired and/or wireless communication, and the memory (or the storage module) may be configured to store a program. The processor invokes the program to implement an operation performed by the terminal or the network device in any one of the foregoing method embodiments and the possible implementations of the method embodiments. The chip system may include the chip, or may include the chip and another discrete component, such as a memory (or a storage module) and/or a transceiver (or a communication module).

Based on a same concept as the foregoing method embodiments, this application further provides a communication system. The communication system may include the foregoing terminal and/or the foregoing network device. The communication system may be configured to implement an operation performed by the terminal or the network device in any one of the foregoing method embodiments and the possible implementations of the method embodiments. For example, the communication system may have the structure shown in FIG. 1.

A part or all of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like. In the foregoing embodiments, descriptions of embodiments have respective focuses. For a part that is not described in detail in an embodiment, refer to related description in other embodiments.

In the foregoing embodiments, descriptions of embodiments have respective focuses. For a part that is not described in detail in an embodiment, refer to related description in other embodiments.

In the several embodiments provided in this application, it should be understood that the disclosed apparatuses may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual indirect couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one location, or may be distributed on a plurality of network units. Some or all of the units may be selected according to actual needs to achieve the objectives of the solutions of embodiments.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technologies, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in embodiments of this application.

The foregoing description is merely some specific implementations of this application, but is not intended to limit the protection scope of this application. Any person skilled in the art may make changes and modifications to these embodiments within the technical scope disclosed in this application. Therefore, the following claims are intended to be construed as to cover the foregoing embodiments and to indicate changes and modifications falling within the scope of this application. Therefore, the protection scope of this application shall be subject to the protection scope of the claims.

What is claimed is:

1. A method, comprising:
    obtaining, by a terminal, a level-1 broadcast signal sent by a satellite, wherein a beam status corresponding to the level-1 broadcast signal is an energy saving state, and the level-1 broadcast signal comprises synchronization information;
    obtaining, by the terminal, a level-2 broadcast signal sent by the satellite, wherein a beam status corresponding to the level-2 broadcast signal is a broadband communication state; and
    performing, by the terminal, communication based on the level-2 broadcast signal.

2. The method according to claim 1, further comprising:
    before the terminal obtains the level-2 broadcast signal, sending, by the terminal, request information, wherein the request information requests the satellite to send the level-2 broadcast signal.

3. The method according to claim 2, wherein the request information comprises at least one of the following:
    a satellite number called by the terminal, a satellite cell number, or a beam number.

4. The method according to claim 1, wherein sending periods of the level-1 broadcast signal and the level-2 broadcast signal are 1: N, wherein N is a positive integer greater than or equal to 2.

5. The method according to claim 1, wherein when the terminal obtains the level-2 broadcast signal, and the beam status corresponding to the level-2 broadcast signal is the broadband communication state, the terminal has a capability of accessing a network request and performing a communication service.

6. The method according to claim 1, further comprising:
    when the level-1 broadcast signal is obtained, and the beam status corresponding to the level-1 broadcast signal is the energy saving state, periodically sending, by the terminal, request information until a beam status of the satellite corresponding to a location of the terminal changes.

7. The method according to claim 1, wherein the level-1 broadcast signal is scrambled by using a scrambling code associated with a satellite number, and an expression form of scrambling of the level-1 broadcast signal satisfies:

$$C_{broadcast,i,s}(k)=S_{r,i}(k)\times C_{broadcast,i}(k), \text{wherein}$$

$C_{broadcast,i}(k)$ is an original level-1 broadcast signal from a satellite numbered i, $S_{r,i}(k)$ is a scrambling code associated with the satellite number i, and $C_{broadcast,i,s}(k)$ is a scrambled level-1 broadcast signal.

8. The method according to claim 1, wherein:
    the level-1 broadcast signal comprises a synchronization code, and the synchronization code indicates a satellite cell number or a beam number; or
    the level-1 broadcast signal comprises a synchronization code and a beam number.

9. The method according to claim 8, wherein:
    the level-1 broadcast signal further comprises information indicating a sending frequency of the level-2 broadcast signal; or
    a one-to-one mapping relationship exists between a sending frequency of the level-1 broadcast signal and a sending frequency of the level-2 broadcast signal.

10. The method according to claim 8, wherein the level-1 broadcast signal further comprises time domain synchronization information of the level-2 broadcast signal.

11. A terminal device, comprising:
    at least one processor; and
    a non-transitory computer readable storage medium storing a program that is executable by the at least one processor, the program including instructions to:

determine a type of a broadcast signal;
obtain a level-1 broadcast signal, wherein a beam status corresponding to the level-1 broadcast signal is an energy saving state, and the level-1 broadcast signal comprises synchronization information;
obtain a level-2 broadcast signal, wherein a beam status corresponding to the level-2 broadcast signal is a broadband communication state; and
perform communication based on the level-2 broadcast signal.

12. The terminal device according to claim 11, wherein the program further includes instructions to:
before obtaining the level-2 broadcast signal, send request information, wherein the request information requests a satellite to send the level-2 broadcast signal.

13. The terminal device according to claim 12, wherein the request information comprises at least one of the following:
a satellite number, a satellite cell number, or a beam number.

14. The terminal device according to claim 11, wherein sending periods of the level-1 broadcast signal and the level-2 broadcast signal are 1: N, and wherein N is a positive integer greater than or equal to 2.

15. The terminal device according to claim 11, wherein when the terminal device obtains the level-2 broadcast signal, and the beam status corresponding to the level-2 broadcast signal is the broadband communication state, the terminal device has a capability of accessing a network request and performing a communication service.

16. The terminal device according to claim 11, wherein the program further includes instructions to:
when the level-1 broadcast signal is obtained, and the beam status corresponding to the level-1 broadcast signal is an energy saving state, periodically send request information until a beam status corresponding to a location of the terminal device changes.

17. The terminal device according to claim 11, wherein the level-1 broadcast signal is scrambled by using a scrambling code associated with a satellite number, and an expression form of scrambling of the level-1 broadcast signal satisfies:

$$C_{broadcast,i,s}(k)=S_{r,i}(k){\times}C_{broadcast,i}(k), \text{ wherein}$$

$C_{broadcast,i}(k)$ is an original level-1 broadcast signal from a satellite numbered i, $S_{r,i}(k)$ is a scrambling code associated with the satellite number i, and C broadcast, i,s (k) is a scrambled level-1 broadcast signal.

18. The terminal device according to claim 11, wherein:
the level-1 broadcast signal comprises a synchronization code, and the synchronization code indicates a satellite cell number or a beam number; or
the level-1 broadcast signal comprises a synchronization code and a beam number.

19. The terminal device according to claim 11, wherein:
the level-1 broadcast signal further comprises information indicating a sending frequency of the level-2 broadcast signal; or
a one-to-one mapping relationship exists between a sending frequency of the level-1 broadcast signal and a sending frequency of the level-2 broadcast signal.

20. A non-transitory computer-readable storage medium, wherein the non-transitory computer-readable storage medium stores a program, and when the program is invoked by a processor, a terminal is caused to:
obtain a level-1 broadcast signal sent by a satellite, wherein a beam status corresponding to the level-1 broadcast signal is an energy saving state, and the level-1 broadcast signal comprises synchronization information;
obtain a level-2 broadcast signal sent by the satellite, wherein a beam status corresponding to the level-2 broadcast signal is a broadband communication state; and
perform communication based on the level-2 broadcast signal.

* * * * *